(12) United States Patent
Tal

(10) Patent No.: US 10,182,606 B2
(45) Date of Patent: Jan. 22, 2019

(54) HELMUT WITH MONOCULAR OPTICAL DISPLAY

(71) Applicant: Amit Tal, Rechasim (IL)

(72) Inventor: Amit Tal, Rechasim (IL)

( * ) Notice: Subject to any disclaimer, the term of this patent is extended or adjusted under 35 U.S.C. 154(b) by 0 days.

(21) Appl. No.: 15/015,312

(22) Filed: Feb. 4, 2016

(65) Prior Publication Data

US 2016/0227866 A1    Aug. 11, 2016

(30) Foreign Application Priority Data

Feb. 5, 2015  (IL) .......................................... 237122
Feb. 5, 2015  (IL) .......................................... 237123

(51) Int. Cl.

| | | |
|---|---|---|
| A42B 3/04 | (2006.01) | |
| F41G 3/22 | (2006.01) | |
| H04N 5/232 | (2006.01) | |
| G02B 27/01 | (2006.01) | |
| G02B 25/00 | (2006.01) | |
| A42B 3/22 | (2006.01) | |
| F41G 3/16 | (2006.01) | |

(52) U.S. Cl.
CPC .............. *A42B 3/042* (2013.01); *F41G 3/225* (2013.01); *G02B 25/001* (2013.01); *G02B 27/0172* (2013.01); *G02B 27/0176* (2013.01); *H04N 5/23293* (2013.01); *A42B 3/222* (2013.01); *F41G 3/165* (2013.01); *G02B 2027/0143* (2013.01); *G02B 2027/0156* (2013.01)

(58) Field of Classification Search
CPC .... F41H 5/10; A42B 3/08; A42B 3/10; A42B 3/12
See application file for complete search history.

(56) References Cited

U.S. PATENT DOCUMENTS 3,787,109 A *  1/1974  Vizenor ................. A42B 3/042
                                                          2/422
4,259,747 A    4/1981  Taesler et al.
4,364,636 A * 12/1982  Ellis ....................... A42B 3/042
                                                          2/6.2

(Continued)

FOREIGN PATENT DOCUMENTS

CN    102147210    8/2011
CN    202697857    1/2013

(Continued)

OTHER PUBLICATIONS

Office Action dated Aug. 23, 2015 From the Israel Patent Office Re. Application No. 237123.

(Continued)

*Primary Examiner* — Nitin Patel
*Assistant Examiner* — Robert M Stone

(57) ABSTRACT

A helmet includes a protective shell, a monocular eyepiece and a mounting element. The monocular eyepiece displays an image signal to a wearer of the helmet. The eyepiece includes an electronic input configured to input the image signal and at least one mechanical connector. The mounting element is mechanically connected to the protective shell and to the monocular eyepiece, and is shaped to allow the monocular eyepiece to slide along the mounting element and to be secured in front of a wearer's right eye or left eye.

22 Claims, 24 Drawing Sheets

(56) References Cited

U.S. PATENT DOCUMENTS

| | | | | |
|---|---|---|---|---|
| 4,786,966 | A | * | 11/1988 | Hanson .................. F41G 3/165 224/181 |
| 5,000,544 | A | * | 3/1991 | Staveley ................ A42B 3/042 359/630 |
| 5,200,827 | A | | 4/1993 | Hanson et al. |
| 5,251,333 | A | * | 10/1993 | Tsook ................... A42B 3/042 2/6.2 |
| 5,584,073 | A | | 12/1996 | Radzelovage et al. |
| 5,603,117 | A | | 2/1997 | Hudner, Jr. et al. |
| 5,610,678 | A | * | 3/1997 | Tsuboi ................ G02B 27/017 348/341 |
| 5,646,785 | A | * | 7/1997 | Gilboa ................ A42B 3/0493 2/6.3 |
| 5,671,087 | A | * | 9/1997 | Kawamura ........ G02B 27/0172 348/E13.041 |
| 5,722,091 | A | | 3/1998 | Keller et al. |
| 5,739,797 | A | * | 4/1998 | Karasawa ............ G02B 27/017 345/8 |
| 5,880,773 | A | * | 3/1999 | Suzuki ..................... G02B 7/12 345/8 |
| 6,424,321 | B1 | * | 7/2002 | Ronzani ............... G02B 27/017 345/102 |
| 6,804,829 | B2 | | 10/2004 | Crye et al. |
| 7,225,471 | B2 | * | 6/2007 | Sutter ................... A42B 3/228 2/424 |
| 7,243,378 | B2 | | 7/2007 | Desarmaux et al. |
| 7,900,268 | B2 | | 3/2011 | Mahan |
| 8,063,934 | B2 | | 11/2011 | Donato |
| 9,696,552 | B1 | * | 7/2017 | Goergen ............ G02B 27/0176 |
| 2002/0163486 | A1 | * | 11/2002 | Ronzani ............... G02B 27/017 345/87 |
| 2003/0070200 | A1 | | 4/2003 | Crye et al. |
| 2007/0057867 | A1 | * | 3/2007 | Mizuuchi ................ G02B 7/12 345/8 |
| 2007/0271687 | A1 | | 11/2007 | Zhou |
| 2007/0279318 | A1 | * | 12/2007 | Yamamoto ......... G02B 27/0172 345/8 |
| 2008/0170838 | A1 | * | 7/2008 | Teetzel .................. A42B 3/042 386/358 |
| 2009/0040308 | A1 | * | 2/2009 | Temovskiy ................ F41G 3/16 348/158 |
| 2010/0229288 | A1 | * | 9/2010 | Higgins ................ A42B 3/185 2/422 |
| 2012/0242865 | A1 | * | 9/2012 | Vartanian ........... H04N 5/23206 348/239 |
| 2012/0287040 | A1 | * | 11/2012 | Moore .................. G02B 27/01 345/157 |
| 2013/0127980 | A1 | | 5/2013 | Haddick et al. |
| 2013/0222213 | A1 | * | 8/2013 | Abdollahi .......... G02B 27/0176 345/8 |
| 2013/0278631 | A1 | * | 10/2013 | Border ................. G02B 27/017 345/633 |
| 2014/0033406 | A1 | | 2/2014 | Lebel et al. |
| 2014/0139407 | A1 | * | 5/2014 | Abdollahi .......... G02B 27/0176 345/8 |
| 2015/0100179 | A1 | * | 4/2015 | Alaniz ..................... A63F 13/00 701/1 |
| 2016/0227866 | A1 | * | 8/2016 | Tal ...................... H04N 5/23293 |

FOREIGN PATENT DOCUMENTS

| | | |
|---|---|---|
| CN | 202774343 | 3/2013 |
| CN | 202873934 | 4/2013 |
| KR | 10-2013-0123117 | 11/2013 |
| WO | WO 2012/151478 | 11/2012 |
| WO | WO 2014/087254 | 6/2014 |

OTHER PUBLICATIONS

Office Action dated Aug. 30, 2015 From the Israel Patent Office Re. Application No. 237122.
Ben "For Tankers, The Eyes Have It", Micro Vision (MVIS) Blog, p. 1/4-4/4, Apr. 2005.
Crane "Revision Military BATLSKIN ("Battle skin") Modular Head Protection System (MHPS) Lightweight Ballistic Combat Helmet, Visor and Mandibular Guard/Ballistic Face Shield: Complete Ballistic Maxillofacial Protection (Facial Armor) for the 21st Century Warfighter", Defense Review, 5 P., Sep. 14, 2010.
RDECOM "Posts Tagged Helmet and Electronics and Display System—Upgradeable Protection", Army Technology, RDECOM Public Affairs, p. 1/7-7/7, Sep. 6, 2013.
Revision Military "Batlskin Viper Mandible Guard", Revision Military Inc., Datasheet, 1 P., Aug. 2014.
Skully Systems "Skully AR-1: Smartest Helmet", Skully Systems, p. 1/8-8/8, Jan. 21, 2015.
Soldier Systems Daily "AUSA—Ops-Core", Soldier Systems, An Industry Daily, p. 1/3-3/3, Oct. 23, 2012.
Tsantilas "BMW Shows Motorcycle Helmet Head-Up Display and Laser Light Concepts", GIZMAG, Jan. 5, 2016.
Office Action dated Mar. 13, 2016 From the Israel Patent Office Re. Application No. 237122 and Its Translation Into English.

* cited by examiner

HELMUT WITH MONOCULAR OPTICAL DISPLAY

RELATED APPLICATIONS

This application claims the benefit of priority of Israel Patent Application Nos. 237122 and 237123, both filed on Feb. 5, 2015 the contents of which are incorporated herein by reference in their entirety.

FIELD AND BACKGROUND OF THE INVENTION

The present invention, in some embodiments thereof, relates to a helmet and, more particularly, but not exclusively, to a helmet with a monocular eyepiece.

In the most basic configuration helmets typically include a rigid shell, often with padding, with straps for affixing the helmet to the wearer. Today's militaries often use high quality helmets made of ballistic materials such as Kevlar and Aramid, which offer improved protection. More advanced combat helmets include head up displays (HUD) and are designed for attaching other devices such as cameras and night vision devices.

Most sophisticated helmets are designed for aviators (e.g. aircraft and helicopter helmets). Examples of include:

1) JEDEYE™; and
2) The integrated helmet and display sight system (IHADSS); both manufactured by Elbit Systems of America®. Although both the JEDEYE™ and Elbit IHADSS include sophisticated display capabilities, they are bulky and unsuitable for ground combat use.

Advanced helmets are also of interest to motorcycle riders and extreme sport enthusiasts, and may include many additional features, such as a visor, mandible protection, audio capabilities and Bluetooth. More advanced motorcycle helmets include head up displays (HUD) and with an integrated or externally-mounted camera.

Examples of motorcycle helmets with HUD include:

1) The Skully AR-1 helmet with integrated HUD and camera; and
2) Nuviz HUD which may be attached to a full face or modular motorcycle helmet.

The Skully AR-1 HUD is positioned at cheekbone level which requires the wearer to divert their vision in order to view data on the HUD device. The Nuviz HUD attaches to the exterior of the helmet and is therefore vulnerable to exterior impacts.

Additional background art includes:

1) International Patent Application Publication No. CN102147210;
2) "For Tankers, The Eyes Have It" by Ben Averch, http://microvision(dot)blogspondot)co(dot)il/2005/04/for-tankers-eyes-have-it(dot)html;
3) International Patent Application Publication No. CN202774343;
4) International Patent Application Publication No. CN202873934;
5) International Patent Application Publication No. KR20130123117;
6) International Patent Application Publication No. CN202697857;
7) U.S. Pat. No. 5,603,117;
8) U.S. Patent Application Publication No. 2014033406;
9) Revision Military's "BATLSKIN VIPER MANDIBLE GUARDS", http://www(dot)revisionmilitary(dot)com/product/batlskin-viper-high-threat-mandible-guard-ach/;
10) "AUSA-Ops-Core", http://soldiersystems(dot)net/2012/10/23/ausa-ops-core/;
11) International Patent Application Publication No. WO2012151478;
12) U.S. Pat. No. 7,900,268;
13) U.S. Pat. No. 5,722,091;
14) "Helmet and Electronics and Display System—Upgradeable Protection", http://armytechnology(dot)armylive(dot)dodlive(dot)mil/index(dot)php/tag/helmet-and-electronics-and-display-system-upgradeable-protection/;
15) U.S. Pat. No. 4,259,747;
16) U.S. Pat. No. 7,243,378;
17) U.S. Pat. No. 6,804,829;
18) "Revision Military BATLSKIN ("Battle Skin") Modular Head Protection System (MHPS)" by David Crane, http://www(dot)defensereview(dot)com/revision-military-batlskin-modular-head-protection-system-mhps-ballistic-visor-and-mandibular-guardballistic-face-shieldcomplete-ballistic-maxillofacial-protection-for-the-21st-century-warfighted;
19) U.S. Pat. No. 5,584,073;
20) U.S. Pat. No. 8,063,934;
21) International Patent Application Publication No. 2014087254;
22) U.S. Patent Application Publication No. 20070271687; and
23) U.S. Pat. No. 5,200,827.

SUMMARY OF THE INVENTION

Embodiments of a helmet suitable for use by a commander of an ACV (Armed Combat Vehicle) or an APC (Armed Personnel Carrier), as well motorcycle riders, extreme sport enthusiasts and the like, include a monocular eyepiece which displays an image to the wearer. The monocular eyepiece may be positioned in front of the right eye or left eye, by moving the display along a mounting element (also denoted herein a mounting) which attaches the display to the helmet shell. In some embodiments the monocular eyepiece slides along the mounting element, and may be secured in the desired location. In alternate embodiments, the eyepiece is moved to the desired location by detaching it from the mounting element and reattaching it in the desired location.

The monocular eyepiece may be attached to the helmet in any way that allows it to move across the front of the helmet at eye level, be positioned by the wearer at the preferred position along the mounting and be secured at that position (e.g. by a snap or other fastening). In some embodiments the mounting element is shaped to allow the eyepiece to slide or move continuously across the front of the helmet in line with the wearer's eyes. Alternatively, the mounting element may be shaped so that the eyepiece may be secured in specified positions along the mounting element (preferably closely spaced to allow the wearer fine control of the eyepiece's position). Examples of different types of mounting elements are described in more detail below.

According to an aspect of some embodiments of the present invention there is provided a helmet which includes a protective shell, a monocular eyepiece and a mounting element. The monocular eyepiece displays an image signal to the helmet wearer. The eyepiece includes an electronic input for inputting the image signal and at least one mechanical connector. The mounting element mechanically connects the monocular eyepiece to the protective shell and is shaped to allow the monocular eyepiece to slide along the mounting element, so that it may be positioned in front of a wearer's right eye or left eye.

According to some embodiments of the invention, the monocular eyepiece is a heads-up display.

According to some embodiments of the invention, the monocular eyepiece is an augmented reality eyeglass.

According to some embodiments of the invention, the monocular eyepiece is detachable and re-attachable to the mounting element, and the mounting element has multiple locations for attachment of the eyepiece to the mounting element.

According to some embodiments of the invention, the protective shell has an interior pocket along a frontal brim of the shell. The mounting element is pivotably-connected to the protective shell along the frontal brim, such that in a retracted position the mounting element and eyepiece are contained within the pocket and in an open position the eyepiece is positioned at eye level of a wearer.

According to some embodiments of the invention, the shell includes a hardened exterior and an inner lining, and the interior pocket is formed by a gap between the hardened exterior and the inner lining.

According to some embodiments of the invention, the mounting element is connected to the protective shell across a frontal brim of the shell.

According to some embodiments of the invention, the image signal includes an image of an external scene.

According to some embodiments of the invention, the image signal further includes data for display to a wearer of the helmet, and the data overlays the image of an external scene.

According to some embodiments of the invention, the helmet further includes communication circuitry for communicating with a device located in a mobile vehicle.

According to some embodiments of the invention, the communication with the device is wired communication via a cable connecting the helmet to the device.

According to some embodiments of the invention, the communication with the device is wireless.

According to some embodiments of the invention, the helmet includes weapon control circuitry to control weaponry located on the vehicle.

According to some embodiments of the invention, the image signal displays crosshairs and the weapon control circuitry is configured to aim the weaponry towards a physical location viewed at the crosshairs.

According to some embodiments of the invention, the image signal overlays a transparent portion of the eyepiece.

According to some embodiments of the invention, the helmet further includes a visor pivotably-connected to the shell, wherein the visor is exterior to the mounting element and eyepiece, such that in a raised position the visor is positioned above the shell and in a lowered position the visor shields the mounting element and eyepiece.

According to some embodiments of the invention, the helmet further includes a camera mounting for mounting a camera on the protective shell.

According to some embodiments of the invention, the helmet further includes a data connector for connecting a data cable.

According to some embodiments of the invention, the helmet further includes a video connector to input data from a camera.

According to some embodiments of the invention, the helmet further includes a data processor configured to generate the image signal from data input from at least one of: an external device, a camera, GPS (global positioning system) navigation element, a gyroscope, WiFi, Bluetooth and a sensor.

According to some embodiments of the invention, the mounting element includes a slot and the mechanical connector is inserted into said slot to slide the monocular eyepiece along the slot in both directions.

According to some embodiments of the invention, the mounting element includes a frame and the monocular eyepiece includes two mechanical connectors. The first mechanical connector is connected to an upper portion of the frame and the second mechanical connector connected to a bottom portion of the frame. Both of the mechanical connectors are shaped to allow the monocular eyepiece to slide along the mounting element and to be secured in front of a wearer's right eye or left eye.

According to an aspect of some embodiments of the present invention there is provided a helmet which includes a protective shell, a monocular eyepiece and a mounting element. The protective shell has an interior pocket along the frontal brim of the shell. The monocular eyepiece displays an image signal to the helmet wearer overlaying a transparent portion of the eyepiece. The eyepiece includes an electronic input for inputting the image signal and at least one mechanical connector. The mounting element mechanically connects the monocular eyepiece to the protective shell. The monocular eyepiece is able to move along the mounting element, so that it may be positioned in front of a wearer's right eye or left eye. The mounting element is pivotably-connected to the protective shell such that in a retracted position the mounting element and eyepiece are contained within the pocket and in an open position the eyepiece is positioned at eye level of a wearer.

According to some embodiments of the invention, the monocular eyepiece is a heads-up display.

According to some embodiments of the invention, the monocular eyepiece is an augmented reality eyeglass.

According to some embodiments of the invention, the shell includes a hardened exterior and an inner lining, and the interior pocket is formed by a gap between the hardened exterior and the inner lining.

According to some embodiments of the invention, the helmet further includes communication circuitry to communicate with an external device located in a mobile vehicle.

According to some embodiments of the invention, communication with the external device is wired communication via a cable connecting the helmet to the external device.

According to some embodiments of the invention, the helmet further includes a visor pivotably-connected to the shell. The visor is exterior to the mounting element and eyepiece, such that in a raised position the visor is positioned above the shell and in a lowered position the visor shields the mounting element and eyepiece.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
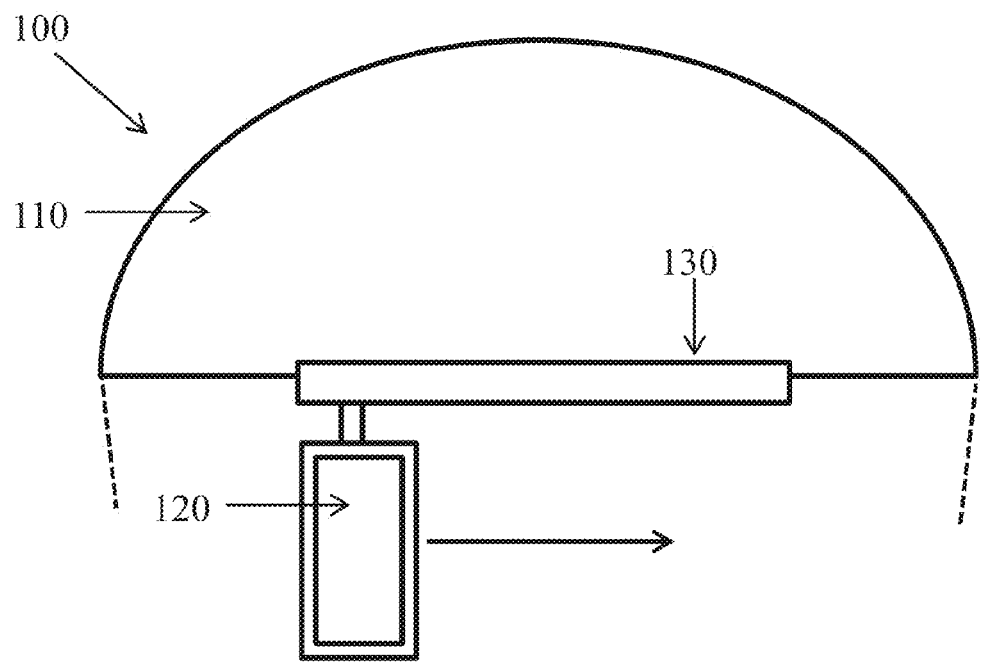
FIGS. 1A and 1B are simplified schematic illustrations of a frontal view of a helmet with the eyepiece on left and right sides respectively, according to embodiments of the invention.

The present invention, in some embodiments thereof, relates to a helmet and, more particularly, but not exclusively, to a helmet with a monocular eyepiece.

Embodiments of a helmet suitable for use by a commander of an ACV (Armed Combat Vehicle) or an APC (Armed Personnel Carrier) include a monocular eyepiece (i.e. for a single eye). The monocular eyepiece (also denoted herein the eyepiece) may be positioned in front of the right eye or left eye, optionally by sliding the eyepiece along a mounting which attaches the eyepiece to the helmet shell. In some embodiments the mounting is pivotable, so that the eyepiece may be retracted under the helmet's hardened shell thus protecting the eyepiece when it is not being used.

The eyepiece displays data received from sensors (e.g. a camera) and/or other electronic equipment, some or all of which may be mounted on the helmet.

Optionally, displayed data is superimposed over a view or image of the external scene. The external scene may be viewed through a transparent portion of the eyepiece and/or be obtained from a camera and displayed on a screen incorporated into the eyepiece.

The monocular eyepiece may be attached to the helmet in any way that allows it to be positioned by the wearer in the preferred location and secured at that position by the wearer (e.g. by a snap or other fastening). In some embodiments the mounting element is shaped to allow the eyepiece to slide or move continuously across the front of the helmet in line with the wearer's eyes and be secured at any position. For example the eyepiece may slide along a groove or slot in the mounting element. Alternatively, the mounting element may be shaped so that the eyepiece may be secured in specified positions along the mounting element (preferably closely spaced to allow the wearer fine control of the eyepiece's position).

In some embodiments, the mounting element is a track or support located above eye level along which the eyepiece may move (for example see FIGS. 1A-1D). In other embodiments, the mounting element is a frame which supports the eyepiece from both above and below (for example see FIGS. 3A-3F). The frame may be open, so that when the lens is positioned in front of one eye the other eye has a direct view past the frame. In other embodiments, the frame has a transparent material in front of both eyes, and the monocular eyepiece slide in front or behind the transparent material. In both cases the eye which is not viewing the eyepiece has an unobstructed view to the exterior environment (i.e. external scene).

The materials used to construct the mounting element and eyepiece are preferably selected to allow smooth motion of the eyepiece along the mounting element. The mounting element and/or eyepiece may contain further elements, such as bearings, which contribute to the ease of positioning of the eyepiece in the mounting element.

Optionally, the monocular eyepiece functions as a heads-up display (HUD). The HUD may be of any type known in the art which is suitable for incorporating into or attaching onto the monocular eyepiece.

In some embodiments, the data for display to the wearer is projected directly into the wearer's eye from an HUD element mounted on the eyepiece. Alternately or additionally, the data is projected onto the eyepiece and is directed and/or reflected by the eyepiece into the wearer's eye.

Optionally, the monocular eyepiece is an AR (augmented reality) heads-up display, showing data rendered on an element resembling an eyeglass (e.g. similar to Google Glass). AR displays are typically small and easily assembled as part of an eyepiece and substantially smaller than the standard HUDs currently in use for military helmets, making them particularly effective when the mounting and eyepiece are retracted under the shell.

Optional embodiments include one or more additional elements, in different combinations. Such additional include but are not limited to:

1) Wired or wireless communication capabilities;
2) Camera, optionally for night vision;
3) Aiming and firing control;
4) Global Positioning System (GPS);
5) Retractable facial, chin and nose protector;
6) Retractable visor for the eyes for protection against dust, optionally with laser beam protection; and 7) Control switches and/or keypad for use by the wearer.

Optionally, one or more of the elements (e.g. visor, face protector, camera) are removable from the helmet for replacement and maintenance. Alternately or additionally, one or more of the physical components are incorporated into the helmet.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIGS. 1A-2C show an exemplary mounting element which includes a support member above eye level, along which the eyepiece is able to move and be secured in the desired location by the user. Other exemplary embodiments, in which the mounting element connects to the eyepiece from above and below, are shown below in FIGS. 3A-3I.

Referring now to the drawings, FIGS. 1A-1D are simplified schematic illustrations of a frontal views of a helmet with the eyepiece on left and right sides respectively, according to embodiments of the invention.

Figure 1B:
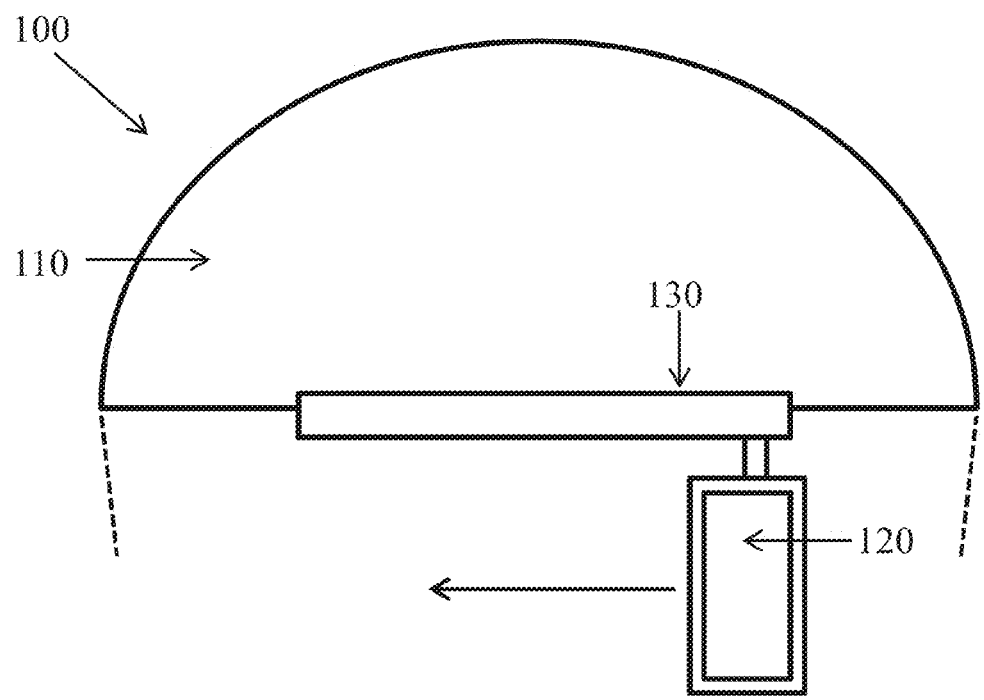
Figure 1C:
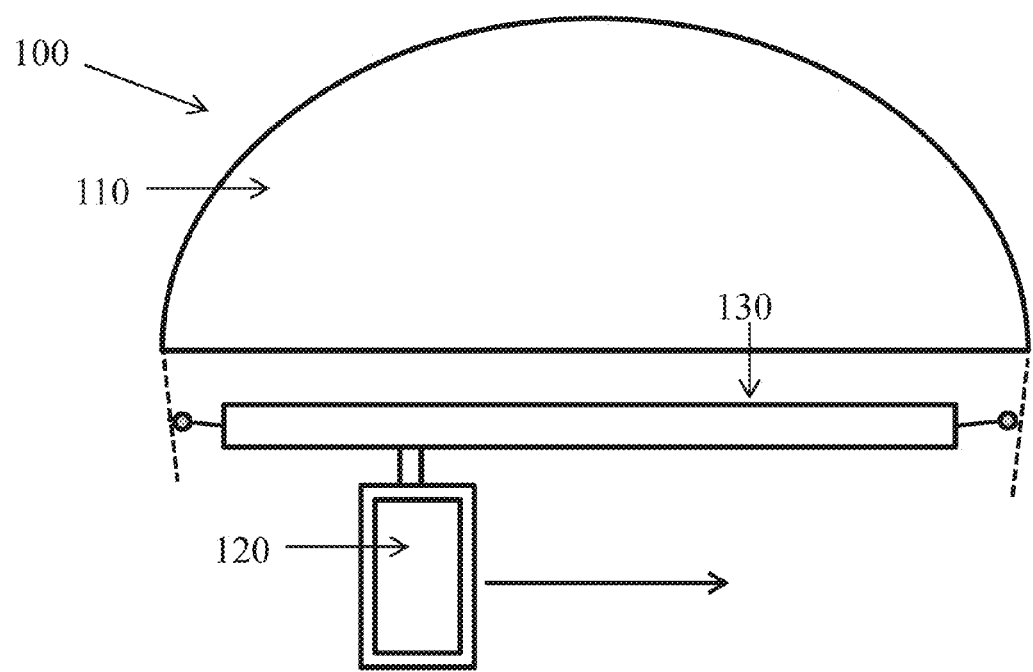
FIGS. 1C and 1D are simplified schematic illustrations of a frontal view of a helmet with the eyepiece on left and right sides respectively, according to embodiments of the invention.
Figure 1D:
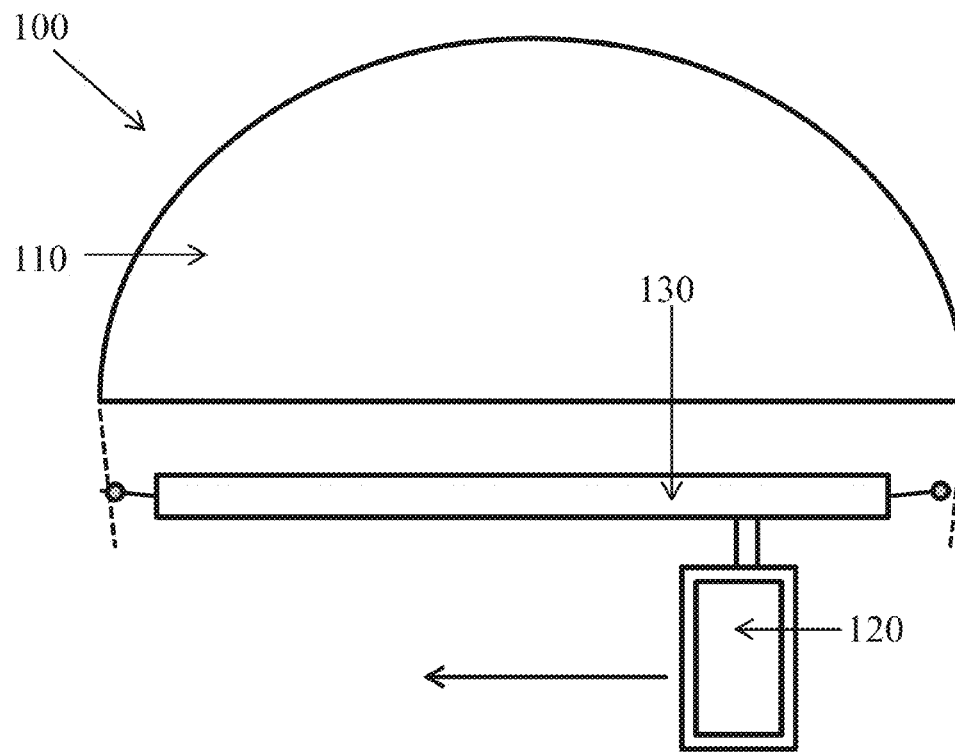

In the embodiments of FIGS. 1A and 1B mounting element 130 is fixed on the frontal brim of the shell. In the embodiments of FIGS. 1C and 1D mounting element 130 is pivotably-connected to the shell, substantially parallel to the frontal brim.

Helmet 100 includes a protective shell 110, monocular eyepiece 120 and mounting element 130. Monocular eyepiece 120 displays an image signal to a wearer of the helmet. Mounting element 130 mechanically connects eyepiece 120 to shell 110. Eyepiece 120 includes an electronic input for inputting image data to be displayed on the eyepiece, and at least one mechanical connector for connecting eyepiece 120 to mounting element 130.

Mounting element 130 is mechanically connected to shell 110 substantially parallel to the shell's frontal brim.

Eyepiece 120 is mechanically connected to mounting element 130 in a manner that allows the eyepiece to be positioned in front of the right or left eye. In some embodiments, eyepiece 120 moves along mounting element 130 such that eyepiece 120 may be positioned by the wearer over the left eye (FIGS. 1A and 1C) or right eye (see FIGS. 1B and 1D), without requiring disassembly and reassembly of the eyepiece 120. In other embodiments, in order to transfer the eyepiece location from one eye to the other eye, eyepiece 120 is detached from mounting element 130 and reattached to mounting element 130 in front of the other eye. Optionally, the wearer is able to position and reposition the eyepiece without removing the helmet. This is important in situations in which quick and secure positioning of the eyepiece is crucial.

The connection between eyepiece 120 and mounting element 130 may be made by any means known in the art. In some embodiments, mounting element 130 contains a slot. The eyepiece's mechanical connector is inserted into the slot and slides across the slot in both directions. Preferably mounting element 130 holds the eyepiece securely in the place selected by the wearer until unlocked by the wearer for repositioning (e.g. by pushing on a spring-loaded button).

Optionally, the wearer is located in a mobile vehicle, and data communication is established between helmet communication circuitry and equipment located in the vehicle. Exemplary embodiments of helmets suitable for use by a commander of an ACV and of helmets suitable for a motorcycle rider are described below.

In some embodiments eyepiece 120 is a heads up device (HUD) which displays data overlaying an image of the external scene. Preferably the HUD is built to military standards and is suitable for use in combat situations, for example by a commander of an ACV. Optionally, eyepiece 120 is an augmented reality (AR) display rendered on a device resembling an eyeglass, preferably manufactured to meet military specifications.

In some embodiments at least a portion of eyepiece 120 is transparent, and the external scene is seen through the transparent portion. In alternate embodiments the entire eyepiece display surface is a video display.

Alternately or additionally, the image of the external scene is input from a camera. Optionally, the camera is an Infra-Red (IR) camera, which may be useful during nighttime activity.

In some embodiments, the camera is mounted on the helmet. The camera mounting preferably protects the camera from damage. Optionally, when the camera is mounted on the shell at least a portion of the camera is inserted into the shell for protection. In alternate embodiments, the camera is integrated into the helmet.

Optionally, at least some of the data is displayed on an opaque portion of the eyepiece (e g framing the image of the external scene).

As used herein, the terms "shell" and "protective shell" mean a hardened exterior portion of the helmet assembly designed to fit over the wearer's head in order to protect the wearer's head from physical dangers, such as debris, projectiles, shock waves and so forth. Preferably the shell is made of a ballistic material suitable for use in combat situations.

As used herein the phrase "image of the external scene" means an image of the external environment substantially similar to a view seen by the naked eye or captured by a camera.

As used herein the phrase "overlaying an image of the external scene" and similar terms mean that at least some of displayed information is positioned such that a viewer looking through the eyepiece simultaneously sees both the displayed information and the external scene.

As used herein, the term "eyepiece" means a device positionable in front of a wearer's eyes which displays images to the wearer. Optionally, the eyepiece includes transparent portions through which the external scene is visible.

As used herein, the terms "mounting element" and "mounting" mean a mechanical element which holds the eyepiece and connects to the helmet shell.

As used herein, the terms "helmet" and "helmet assembly" mean the helmet shell with attached mounting and monocular eyepiece, and optionally with one or more elements (e.g. protective lining, connectors, camera, controls, etc.).

Figure 2A:
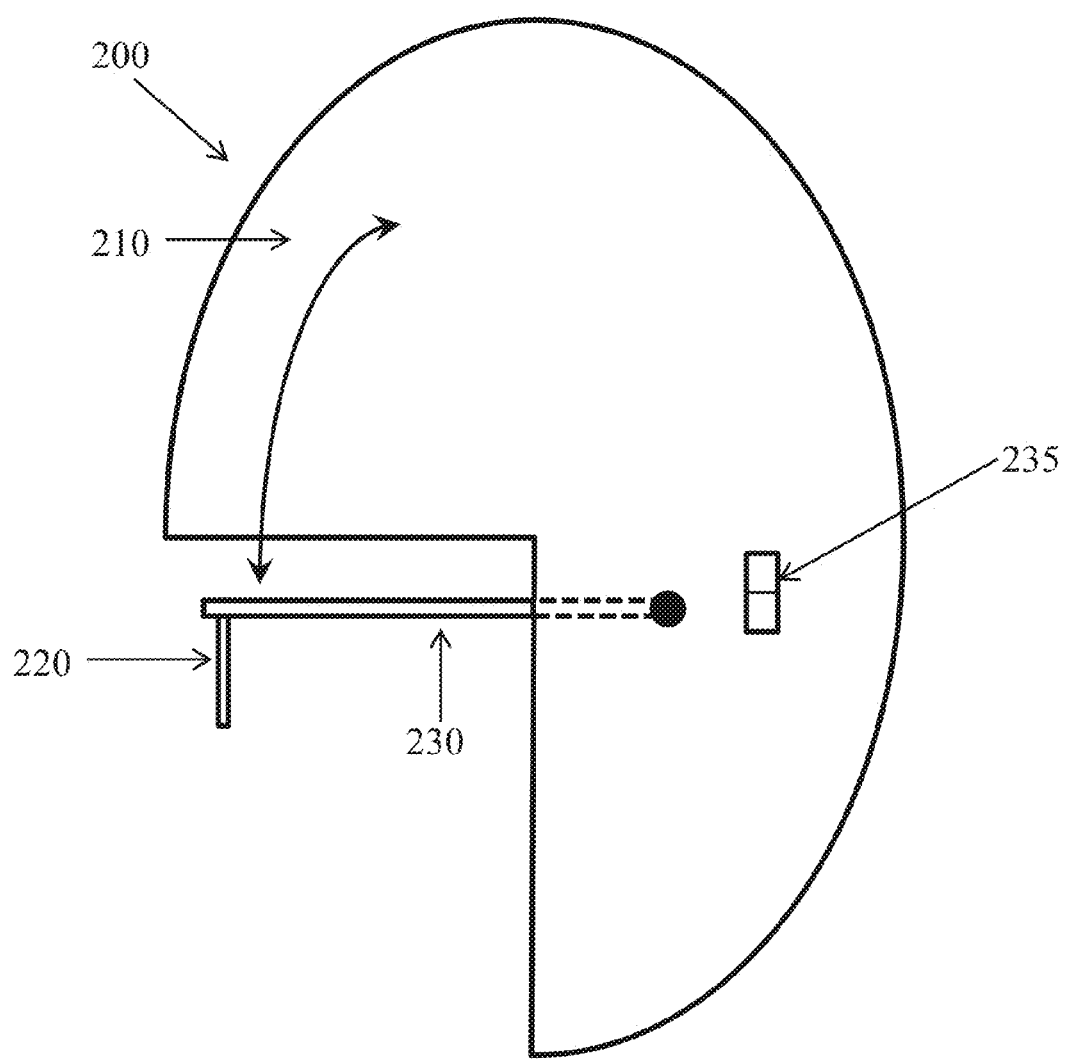
FIGS. 2A and 2B are simplified schematic illustrations of a side view of a helmet with eyepiece in open and retracted positions respectively, according to embodiments of the invention.
Figure 2B:
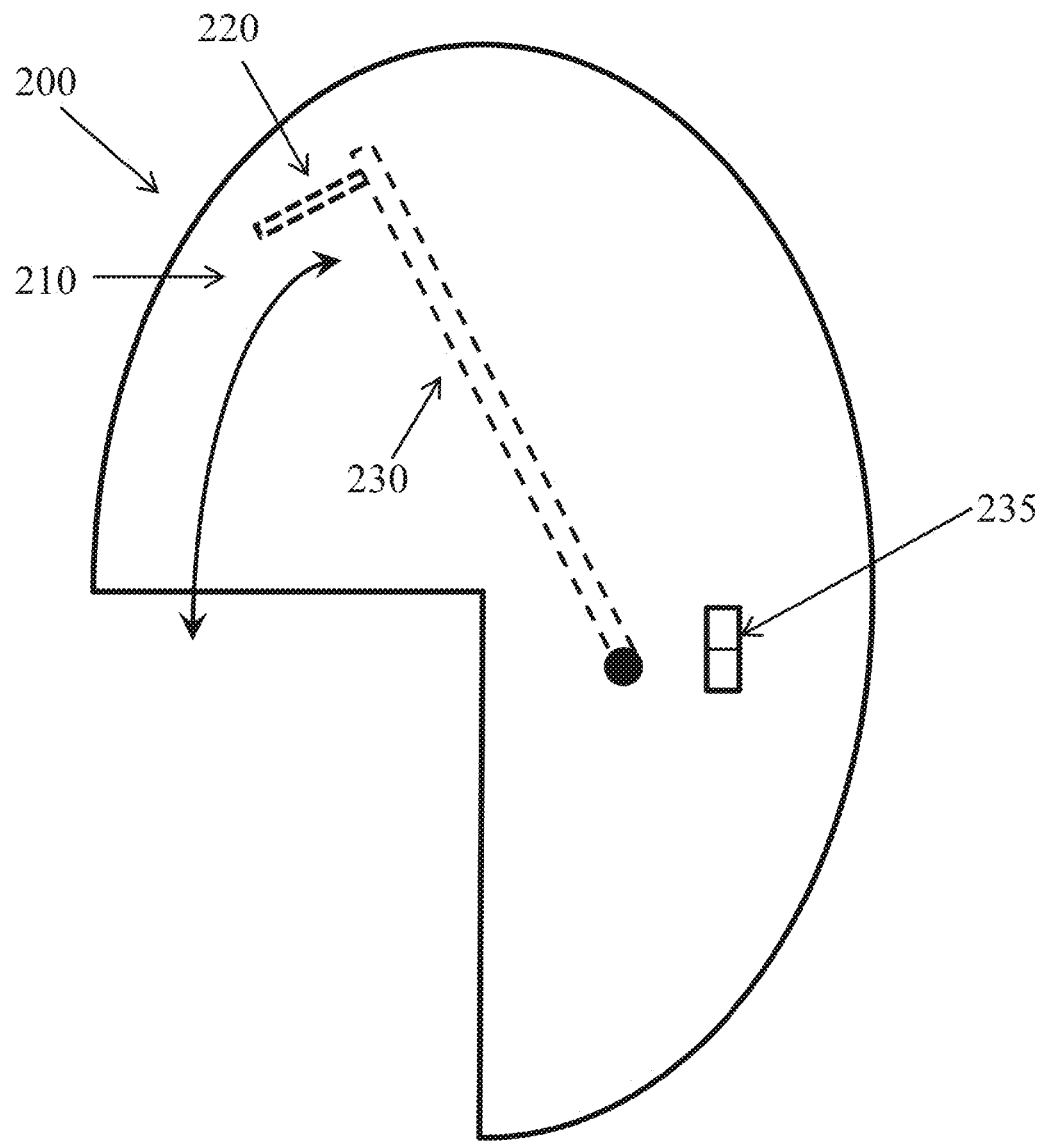

Reference is now made to FIGS. 2A and 2B which are simplified schematic illustrations of a side view of a helmet with eyepiece in open and retracted positions respectively, according to embodiments of the invention. Optionally, shell 210 has a pocket (not shown) along the frontal brim of the shell. Mounting element 230 is pivotably-connected to shell 210. In the open position eyepiece 220 is positioned at eye level of a wearer (see FIG. 2A). In the retracted position mounting element 230 and eyepiece 220 are contained within the pocket (see FIG. 2B). In the retracted position eyepiece 220 does not interfere with the wearer's field of view and is protected by shell 210. Optionally, the pivotable-connection between mounting element 230 and shell 210 is lockable in open position, and unlocking mounting element 230 (e.g. by pushing a button) causes mounting element 230 to move automatically into the retracted position. Optionally, image data is automatically switched on and off when the eyepiece is in the open and retracted positions respectively, so that the image data is not displayed on eyepiece 220 when the eyepiece is retracted.

Optionally, shell 210 includes a hardened exterior and an inner lining, and the pocket into which the mounting element retracts is between the lining and the hardened exterior. The lining may provide the wearer with additional protection (e.g. shock protection) and/or be adjustable to the wearer's head.

Optionally, helmet 200 includes communication circuitry for wired and/or wireless communication with external devices and/or personnel. Optionally at least one communication channel is bi-directional. Additionally or alternately, at least one communication channel is uni-directional. Optionally, the types of communication supported by the communication circuitry include:

1) Data communication;
2) Voice communication; and
3) Video communication.

Figure 2C:
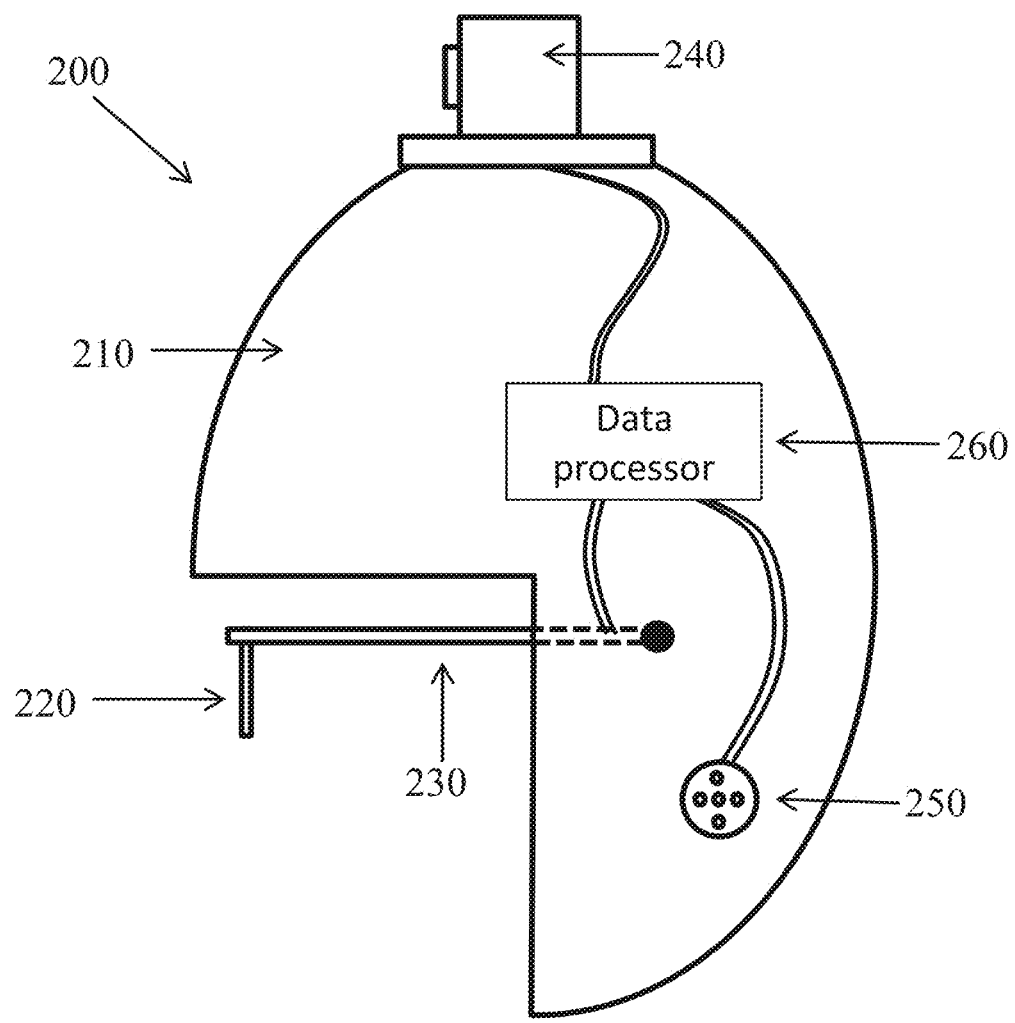
FIG. 2C is a simplified schematic illustration a helmet with camera, according to embodiments of the invention.

Reference is now made to FIG. 2C which is simplified schematic illustration a helmet with camera, according to embodiments of the invention. Optionally, helmet 200 includes one or more of:

i) Camera 240;
ii) Data connector 250; and
iii) Data processor 260.

For clarity, in FIG. 2C data processor 260 is shown on the helmet shell, but it may be located on any portion of the helmet assembly which enables it to input data for processing and to provide image data to eyepiece 220.

Camera

In some embodiments, helmet 200 includes camera 240 which connects to a camera mounting on the helmet or is incorporated into the helmet (optionally at the apex of the helmet). Preferably the camera mounting allows fast connection and disconnection which is both secure and convenient. The camera mounting optionally includes electrical connections for video and other data and/or for powering camera 240. Alternately, camera 240 is powered by batteries located in the helmet or includes battery backup when no external power is available.

Optionally, camera 240 is a thermal camera which assists the wearer at night or in poor light conditions. Camera 240 may be adjustable to change the brightness of the image and/or polarity of the objects viewed (e.g. black hot or white hot).

Camera 240 may be forward facing, side facing or rear facing. For example, when camera 240 is rear facing the camera image may be displayed in a corner of the eyepiece thus assisting the wearer similarly to a rear view mirror.

Optionally, camera 240 includes a moveable lens which changes orientation within the camera to focus on different areas of the external scene based on the detected position of the helmet and/or wearer's direction of view (i.e. the direction the wearer's eyes are pointing).

Optionally, the camera output connects to the eyepiece without further processing. Alternately or additionally, the camera output connects to data processor 260 which processes the video data prior to display on the eyepiece.

Optionally, camera 240 is automatically switched on and off when the eyepiece is in the open and retracted positions respectively. Optionally, data relating to camera functions (e.g. remaining time of recording capacity) is displayed only when the camera is active.

Optionally, camera 240 has video and/or audio recording capabilities.

Optionally, recorded data is saved on a memory card located in the camera and/or in a housing in the helmet. When camera 240 is only recording and the recording is being saved on a memory card in the helmet there may be no need to electrically connect camera 240 to helmet 200. Optionally, recorded data may be downloaded from a data port on the camera.

Optionally, camera 240 is made with and/or is covered by insulating materials that protect the camera from damage and vibrations.

Data Connector

Optionally, helmet 200 includes data connector 250, which connects to an external cable. The cable may carry communication signals for uni-directional or bi-directional communication with external devices. Alternately or additionally, the cable may include a power connection for powering helmet-mounted elements and/or recharging helmet batteries.

Communication with a Mobile Device

Optionally, helmet 200 is capable of wired or wireless communication with a mobile device. Data from mobile device apps may be processed for display on eyepiece 220. Examples of data obtainable via a mobile device include one or more of:

i) Map (topographical or satellite);
ii) Clock;
iii) Weather;
iv) Distances;
v) Altitude;
vi) Current conditions (e.g. wind chill, heat stress).

Optionally, helmet 200 includes a switch for connecting/disconnecting communications between the wireless device and helmet communication elements.

Data Processor

Data processor 260 processes data as required for helmet functions, such as generating images for display on eyepiece 220 and/or for communication and/or controlling external devices. Optionally, data is input into data processor 260 from the external cable. Alternately or additionally, data is received by wireless communication (e.g. mobile device, satellite communications, cellular communications).

Optionally, data processor 260 combines multiple data sources prior to providing the image data for display on eyepiece 220. In some embodiment, data processor 260 generates the image signal displayed on eyepiece 220 from data input from at least one of:

i) an external device (obtained by wireless communication and/or wired communication);
ii) a camera;
iii) GPS (global positioning system) sensor;
iv) gyroscopes;
v) WiFi;
vi) Bluetooth; and
vii) a mobile device (e.g. phone or tablet).

For example, the camera data and data received through data connector 250 may be combined to form a video image overlayed with positional and targeting information.

Reference is now made to FIGS. 3A-3I, which are simplified schematic illustrations of a helmet in which mounting element 130 includes a frame holding the monocular eyepiece, according to embodiments of the invention.

Figure 3A:
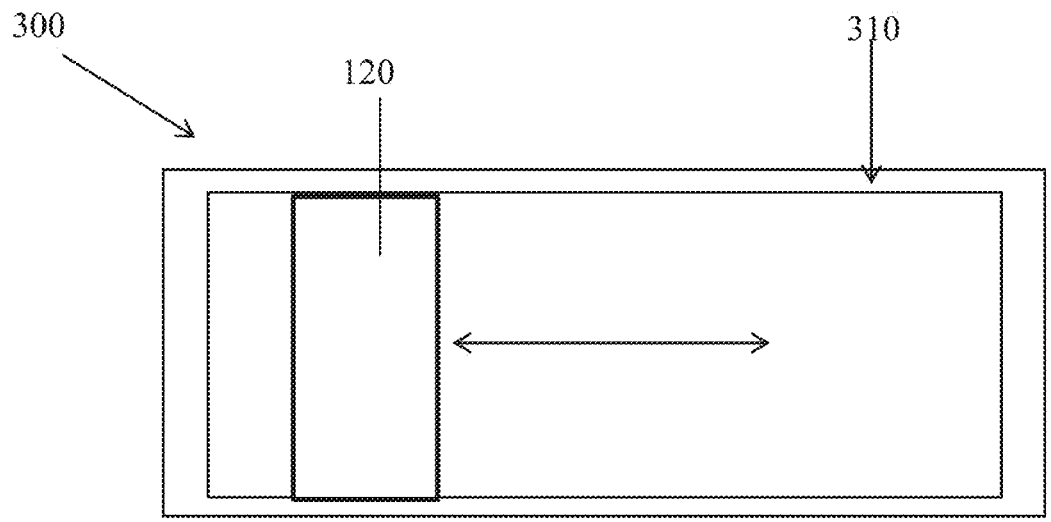
FIGS. 3A and 3B are simplified schematic illustrations of a mounting element according to exemplary embodiments of the invention.
Figure 3B:
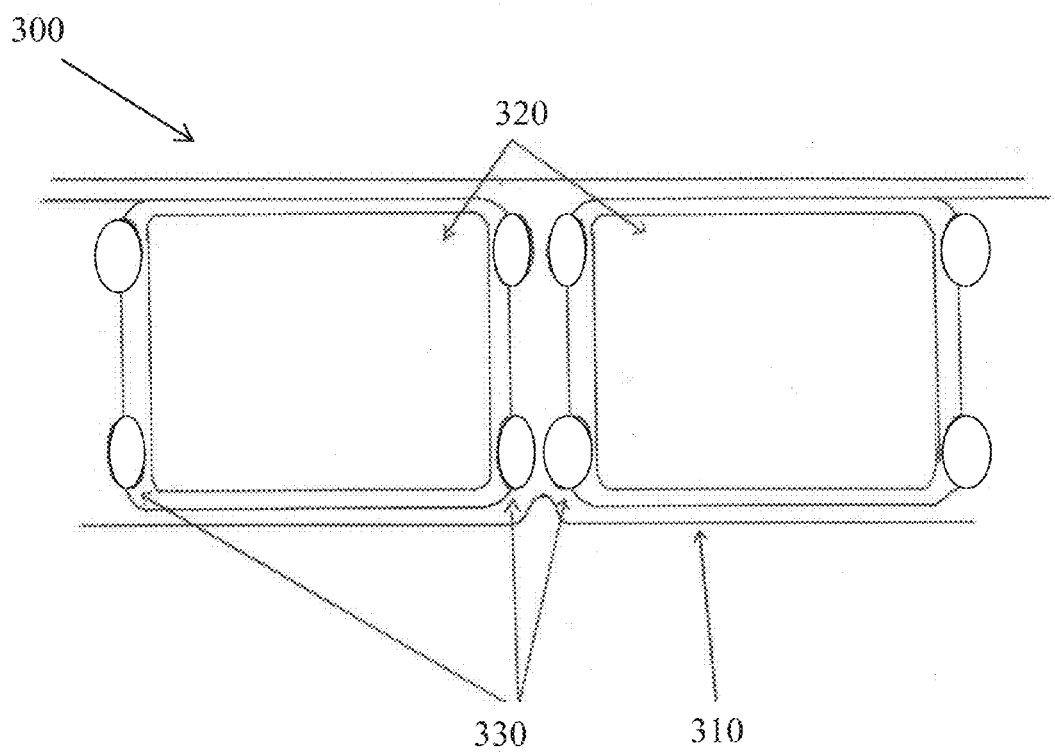
Figure 3C:
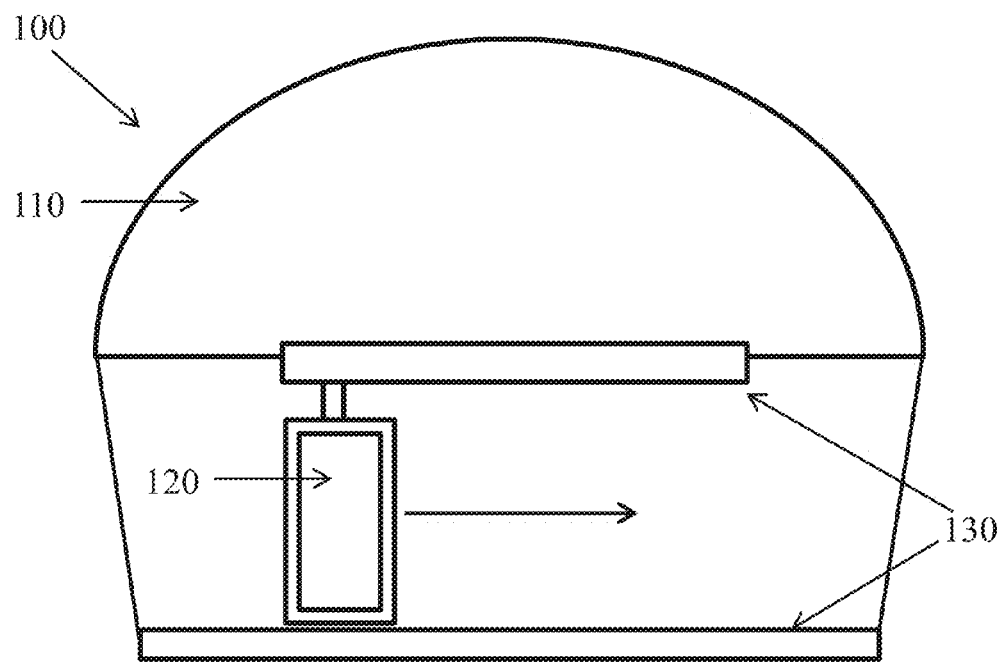
FIGS. 3C-3F are simplified schematic illustrations of frontal views of a helmet, according to embodiments of the invention.
Figure 3D:
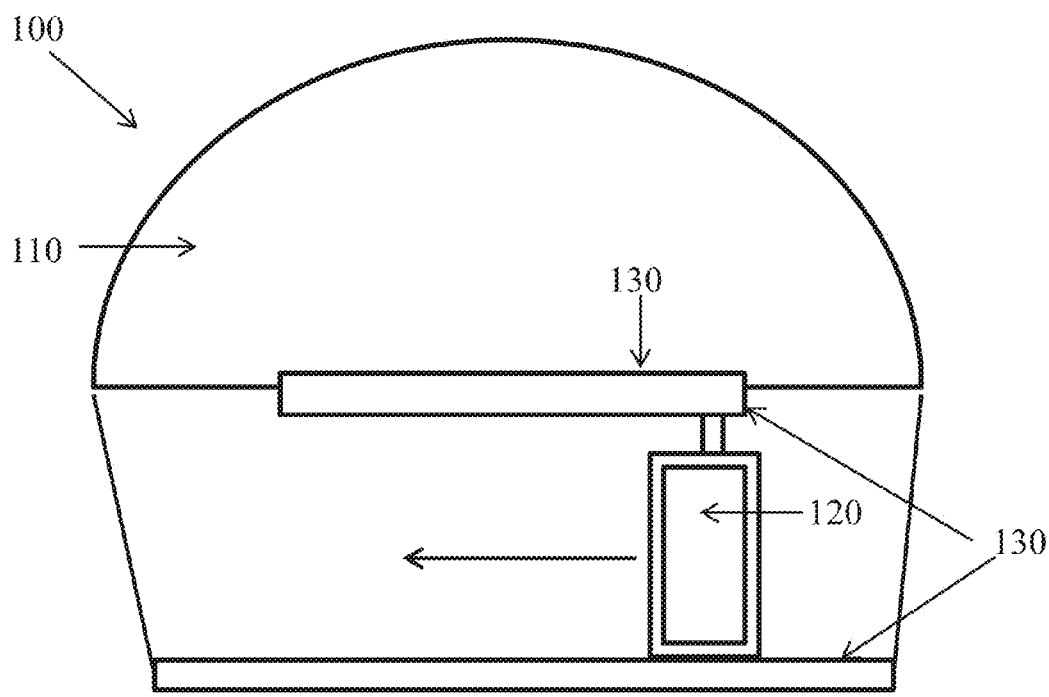
Figure 3E:
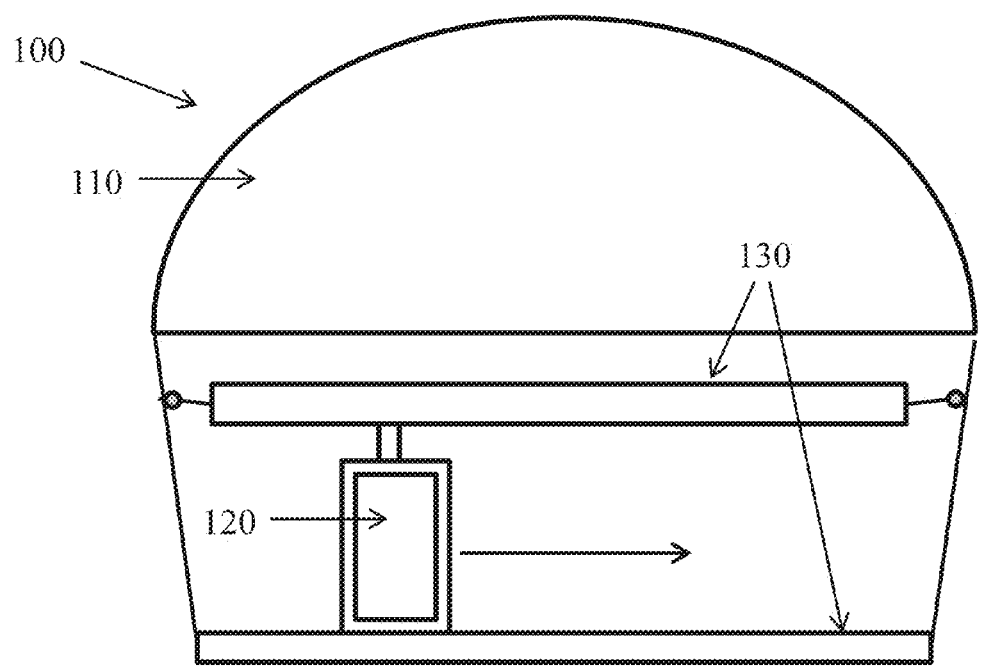
Figure 3F:
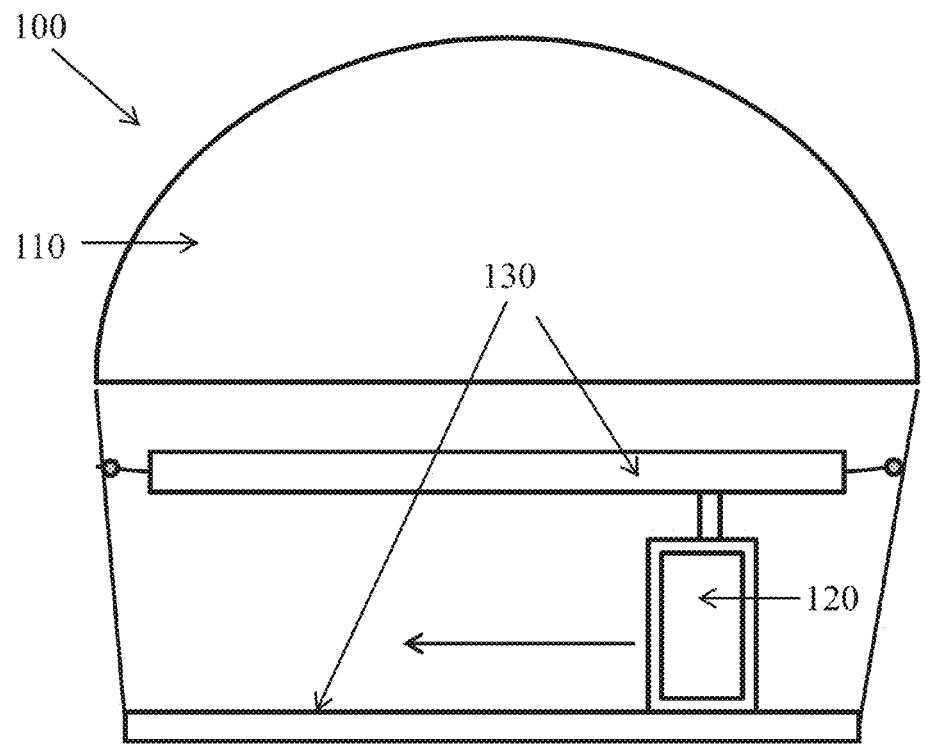
Figure 3G:
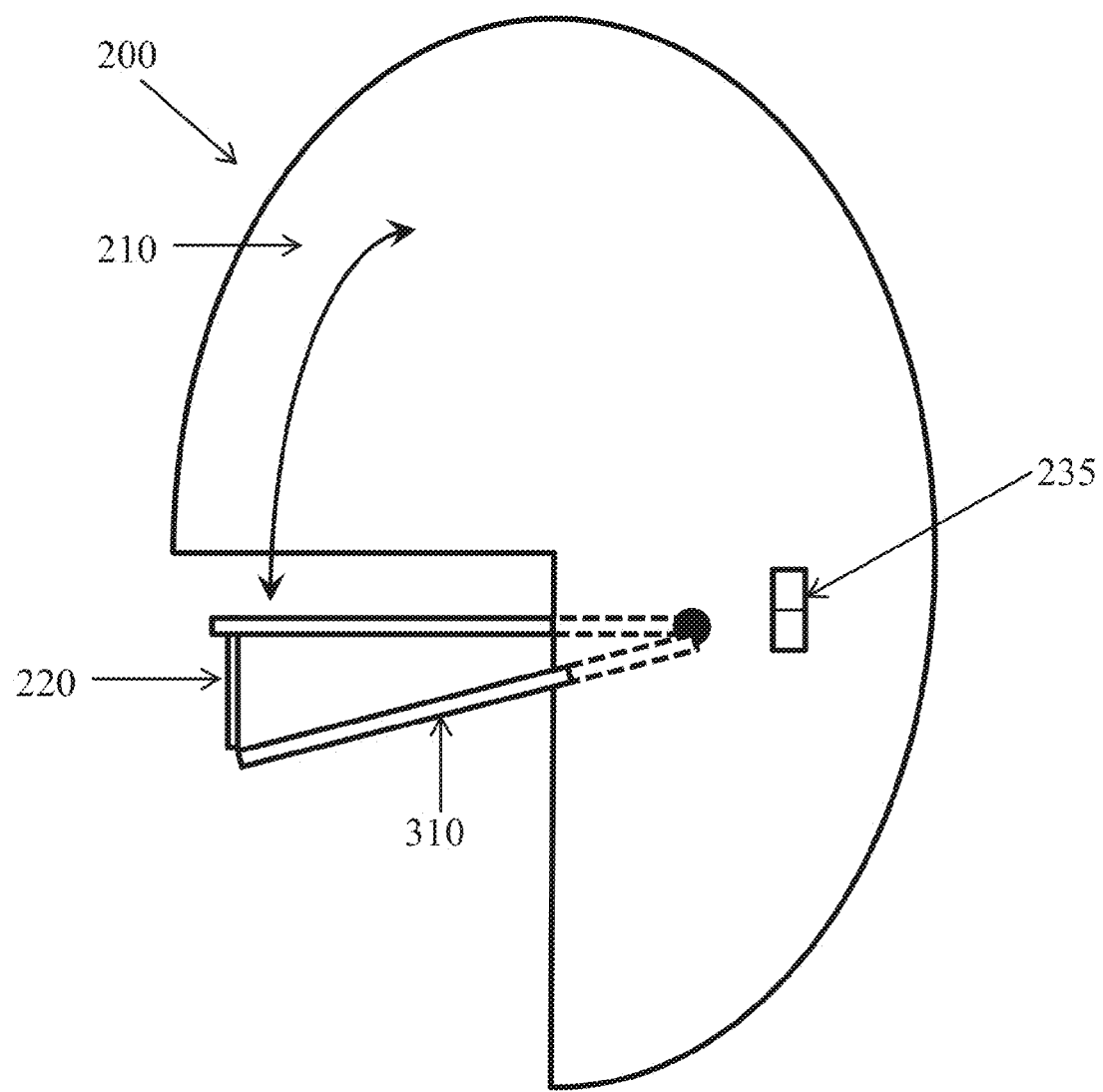
FIGS. 3G and 3H are simplified schematic illustrations of a side view of a helmet with eyepiece in open and retracted positions respectively, according to embodiments of the invention.
Figure 3H:
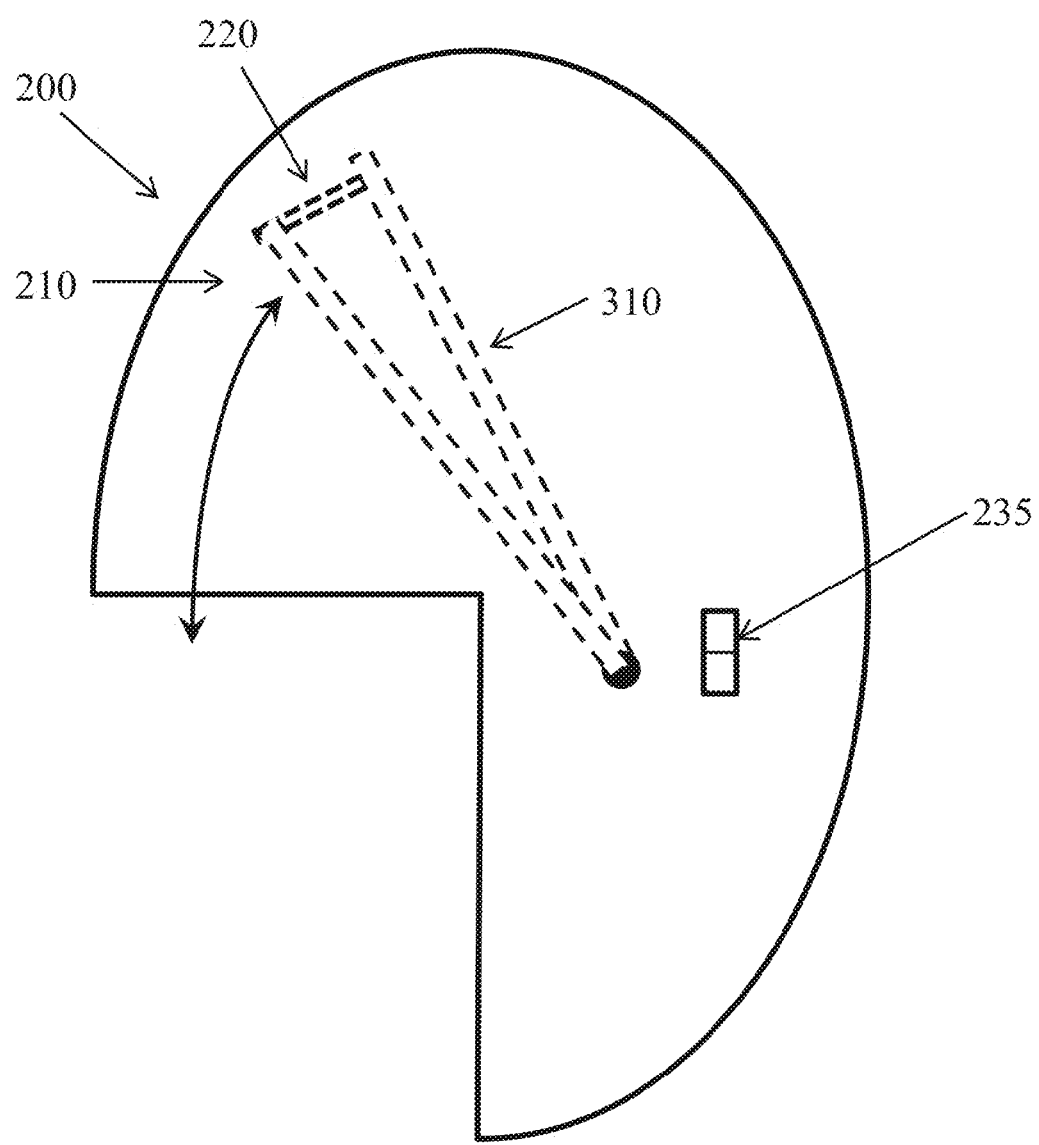
Figure 3I:
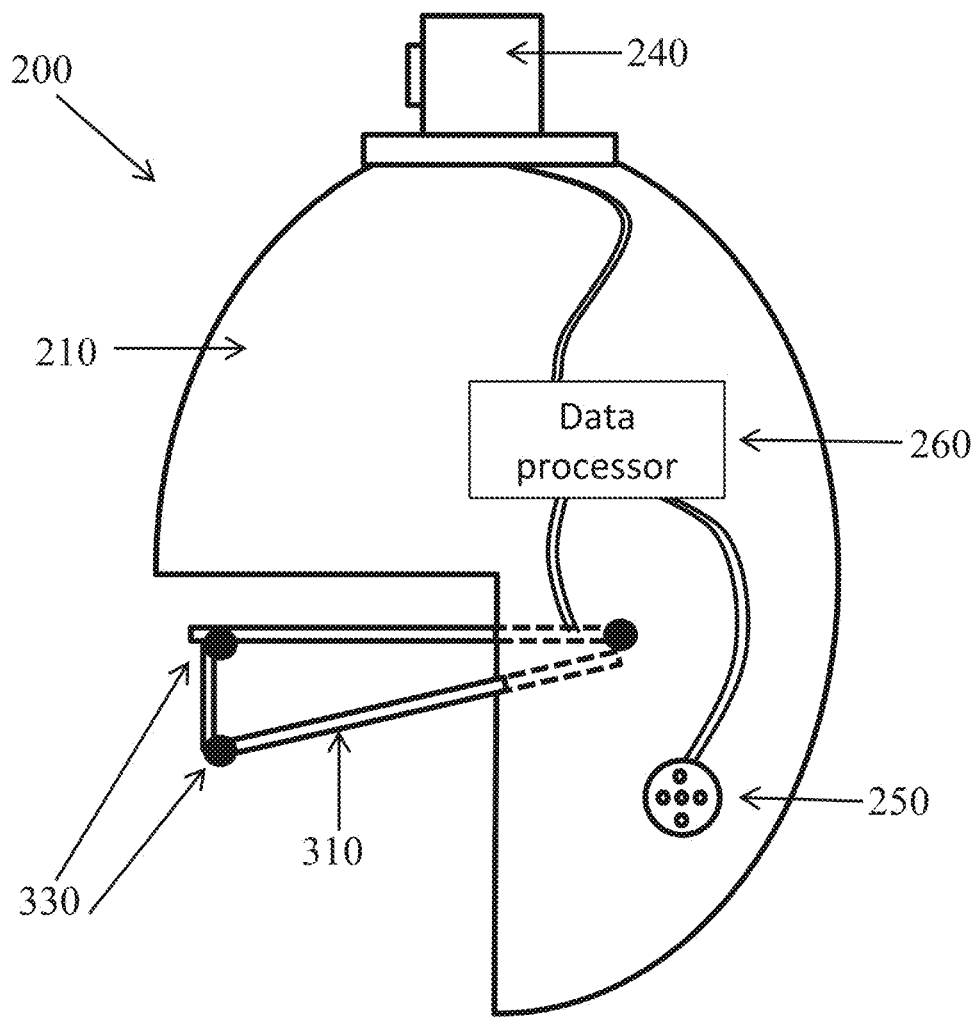
FIG. 3I is a simplified schematic illustration a helmet with camera, according to embodiments of the invention.

As used herein the term "frame" means an element in which eyepiece 120 moveably connects to both an upper and a lower horizontal support element. In some embodiments the frame also contains vertical support elements which provide mechanical support to the mounting element but do not connect directly to the monocular eyepiece. FIGS. 3A and 3B show exemplary embodiments of a frame with vertical and horizontal support elements, forming a rectangularly shaped frame. FIGS. 3C-3G show exemplary embodiments of frames which include upper and lower horizontal support elements.

In some embodiments, the frame is open, so that when the eyepiece is positioned in front of one eye there is no material in the frame in front of the other eye. (It is noted that when the helmet contains a visor or other shield, the other eye may not have a direct view to the outdoor environment but may be protected by the visor). Alternately, the frame has a transparent material in front of both eyes. When the eyepiece is positioned in front of one eye, the other eye views the outdoor environment through the transparent material in the frame.

The frame and monocular eyepiece are shaped so that the eyepiece may move (e.g. slide) in the frame to the right and left. By including a frame in the mounting element, the mounting element may be strengthened and may provide more support for the eyepiece, allowing for more delicate positioning of the eyepiece in front of the wearer's eyes. In some embodiments the frame is transparent, thereby minimizing its visual interference for the wearer.

Reference is now made to FIGS. 3A and 3B, which are a simplified schematic illustrations of a mounting element according to embodiments of the invention. Mounting element 300 includes rectangular frame 310. FIG. 3B shows an exemplary embodiment of a rectangular frame 310 which includes openings 320 in front of both eyes. Eyepiece 120 may be positioned in either the left or right opening. In some embodiments the monocular eyepiece is smaller than the eyepiece openings and is positionable by the user within the opening. In alternate embodiments the eyepiece is the same shape and/or size as opening 320.

Optionally, the frame is detachable from the helmet together with the monocular eyepiece. When the frame is reattached, the electronic and data connections are restored to the eyepiece and to sensors in the frame (if present).

Reference is now made to FIGS. 3C-3I which include a mounting element with frame, and which correspond to FIGS. 1A-2C respectively.

Optionally, the frame includes one or more sensors (e.g. sensors 330).

Optionally, some or all of sensors 330 track the wearer's eye motion. Examples of types of sensors include: laser sensors, optical sensors, thermal sensors, volume sensors and shape change sensors. As described herein, the sensor data may be provided to data processor 260, which analyzes the data to determine which direction the wearer's eyes are pointing (e.g. relative to GPS and/or gyroscope data which shows the wearer's location, azimuth and orientation). Optionally, data processor 260 positions the image and/or other indicators (such as crosshairs) on the monocular eyepiece based on the data collected by the sensors.

Alternately or additionally, data processor 260 instructs other helmet or external elements based on analysis of sensor data. In one exemplary embodiment, data processor 260 controls the direction of a helmet mounted camera. This may compensate for eye motion which changes the wearer's field of view before the camera direction changes as the head is turned.

Figure 4:
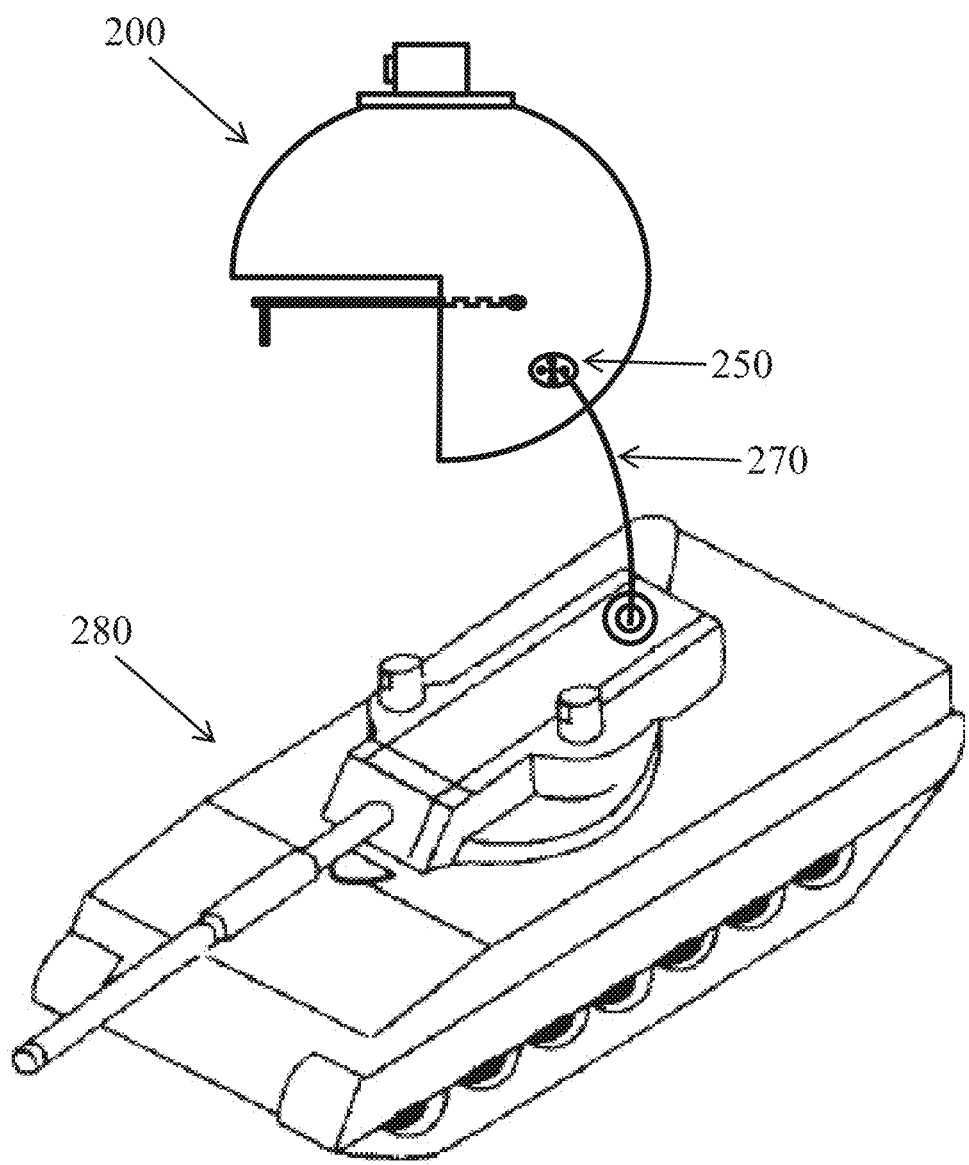
FIG. 4 is a simplified illustration of a helmet connected to a vehicle, according to embodiments of the invention.

Reference is now made to FIG. 4, which is a simplified illustration of a helmet connected to a vehicle, according to embodiments of the invention. Cable 270 attaches to a connector on helmet 200, and connects the helmet to equipment inside vehicle 280. Cable 270 may be used for any required purpose, including but not limited to:

1) Wired data communication;
2) Power connection; and
3) Mechanical connection (e.g. controlling a switch inside vehicle 280).

Visor

Figure 5:
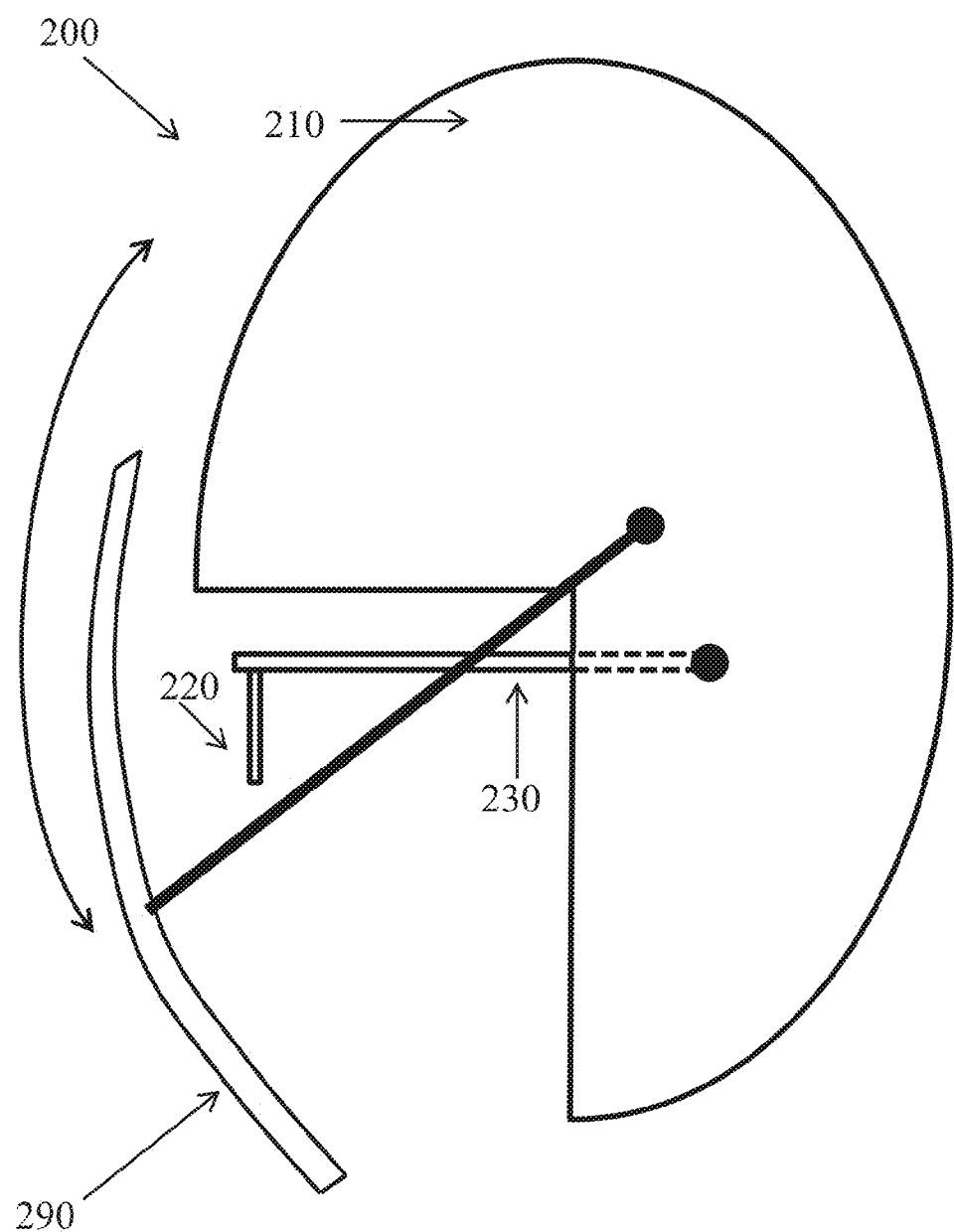
FIG. 5 is a simplified schematic illustration a helmet with visor, according to embodiments of the invention.

Reference is now made to FIG. 5 which is a simplified schematic illustration a helmet with visor, according to embodiments of the invention. Visor 290 is exterior to eyepiece 220 and mounting 230. When visor 290 is down it shields eyepiece 220. When visor 290 is raised it is positioned above shell 210. Optionally, visor 290 does not intrude into the camera's field of view in either the raised or open position.

Optionally visor 290 also protects against laser beams.

Global Positioning System (GPS)

Optionally, the helmet assembly includes a GPS navigation element. In some embodiments the GPS navigation element is positioned on (or close to) the apex (top) of the helmet, optionally behind the camera. Optionally, GPS data is displayed on eyepiece 210. Alternately or additionally, the GPS data is output to external devices by wired and/or wireless communication. This enables tracking of the helmet location and/or provides location data for people and/or equipment near the helmet. Optionally GPS data is displayed independently of the connection to, or operation of, camera 240.

Orientation and Rotation Monitoring

In some embodiments, helmet 200 includes gyroscopes for determining orientation and/or rotation. Optionally, gyroscopic data is output from the helmet to external devices by wired or wireless communication.

Weaponry Guidance and Control

In some embodiments, helmet 200 includes electronic and/or mechanical controls for controlling weaponry (e.g. a cannon, the primary weapon for an APC) and/or other equipment located on a vehicle such as an ACV. Optionally the helmet is connected to the vehicle by a cable.

Optionally, the image signal seen by the wearer on the eyepiece shows crosshairs. Further optionally, the weaponry may be aimed towards the physical location viewed at the crosshairs under the wearer's control and/or automatically.

Optionally, the eyepiece displays two distinct types of crosshairs, one in the direction of view of the wearer and the other in the direction the weapon is pointing. When the crosshairs overlap the target may be considered acquired.

Face Protector

In some embodiments, the helmet includes a face protector, preferably padded, which protects the lower portion of the wearer's face (e.g. mouth and chin).

Optionally, the face protector is pivotably-connected to the shell and may be flipped open or closed as needed. Optionally, the face protector includes openings for inserting items such as a mouthpiece or straw.

Optionally the face protector and visor may be raised and lowered together or separately.

Power

Optionally, the helmet is powered by one of:

1) Battery mounted on or incorporated into the helmet;
2) Via the data cable, with or without battery backup; and
3) Via a dedicated power cable, with or without battery backup.

Accessories

Optionally helmet 200 includes one or more elements (e.g. adaptors, clips and straps) for connecting accessories mechanically and/or electrically to helmet 200. Such accessories may include the camera, flashlight, warning light and so forth. The connection between the accessories and the helmet are preferably by clips and straps with single hand use for fast connection and/or disconnection, and on the other hand provide durability and security against involuntary disconnection and to prevent loose and insecure connections.

Safety Features

Optionally, helmet 200 includes safety features such as reflectors, lights and a horn to ensure that the wearer's presence is known to others.

View

The data displayed to the wearer may be positioned on the eyepiece in any convenient place in the wearer's field of view, including but not limited to:

1) Data bar or bars at the top/bottom/side of the eyepiece;

2) On a stationary location within the view of the external scene (e.g. central crosshairs for vehicle guidance and for firing control);

3) On a moving location within the view of the external scene (e.g. aiming crosshairs showing the weapon's direction of fire or companion vehicle); and 4) Overlaying one or more corners of the external scene.

Figure 6A:
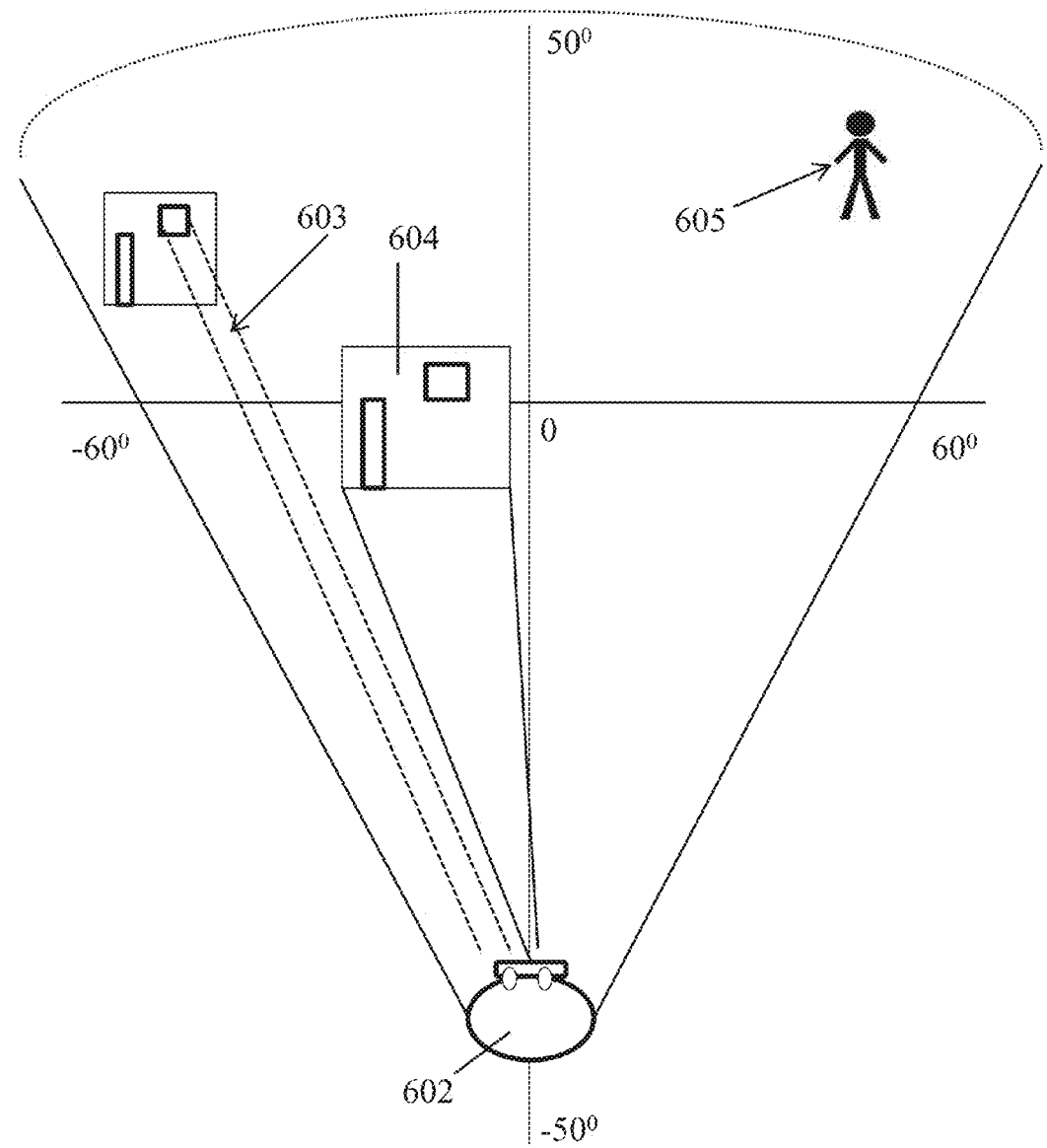
FIG. 6A is an exemplary illustration of objects and images viewed by a wearer of a helmet with monocular eyepiece.

The normal field of view of the binocular human vision is 120 degrees horizontally (i.e. −60° to +60°) and 100 degrees horizontally (i.e. −50° to +50°). FIG. 6A illustrates objects and images viewed by a wearer of a helmet with monocular eyepiece according to exemplary embodiments described herein. Helmet 602 includes sensors which detect the wearer's direction of view 603. The camera on helmet 602 is pointed in the direction the wearer is looking. An image 604 of the object the wearer is looking at is received from the camera and displayed on the monocular eyepiece. The wearer is able to see other objects (i.e. image 605) with the eye which is not viewing the monocular eyepiece.

Figure 6B:
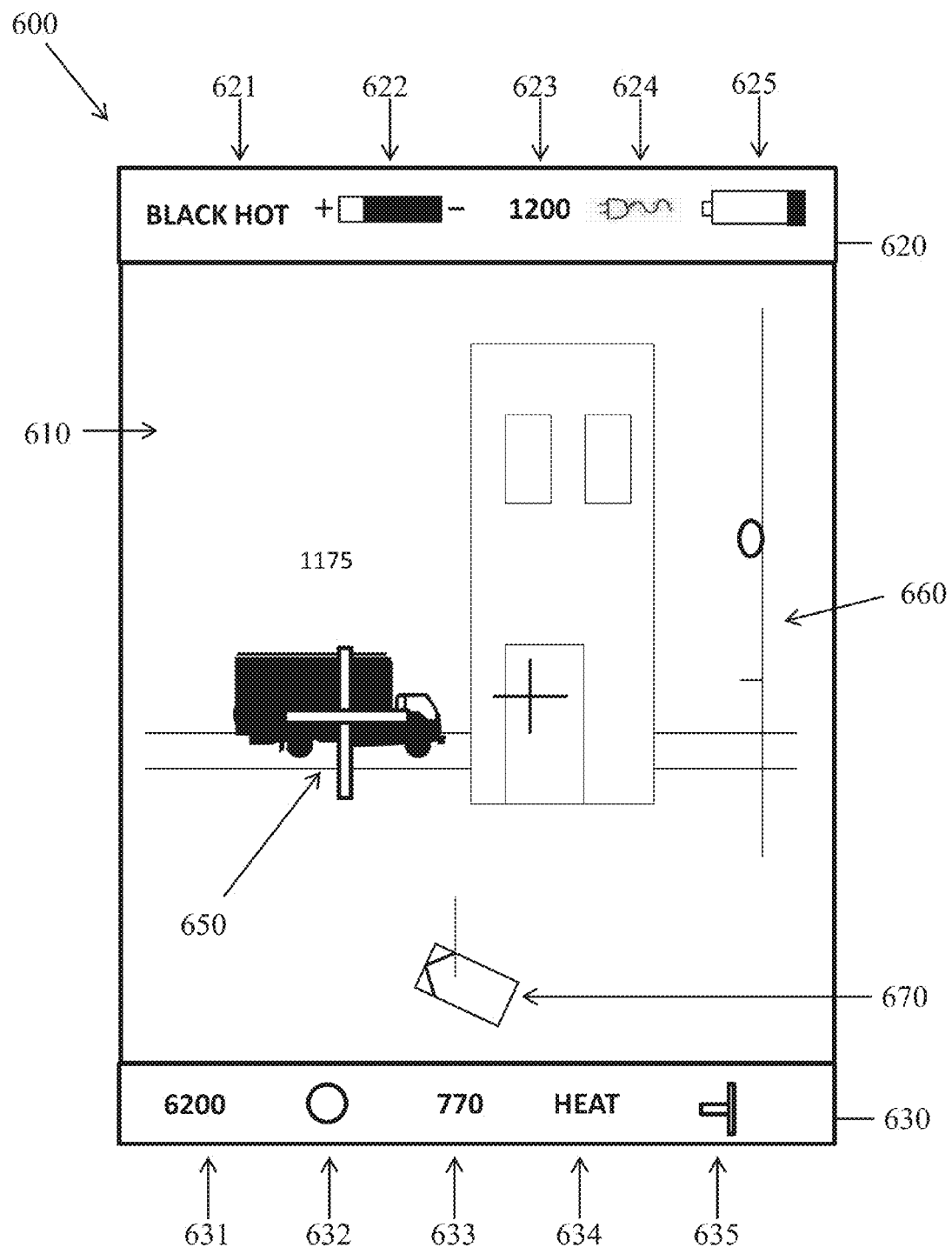
FIGS. 6B-6D are exemplary illustrations of a view seen by a wearer when the eyepiece is positioned in front of the wearer's eye.

Reference is now made to FIG. 6B, which is an exemplary illustration of an image 600 seen by a wearer when the eyepiece is positioned in front of the wearer's eye. Some of displayed information (e.g. GPS coordinates) is displayed on the borders of the eyepiece area. Other information (e.g. crosshairs, corner inset) overlays an interior area of the eyepiece, so that the displayed information overlays the external scene.

Displayed image 600 includes several windows: external scene window 610, top data bar 620 and bottom data bar 630.

a) External scene window 610—The view of the external scene is seen in the central portion of the eyepiece, and may be input from a camera and/or viewed through a transparent portion of the eyepiece. Additional data overlays the external scene. Central crosshairs 640 are positioned in the center of the view. Weapon crosshair indicator 650 indicates the weapon's trajectory. Weapon height indicator 660 shows the weapon's angle of elevation with respect to the maximum and minimum obtainable angles and to an index plane. Hull indicator 670 indicates the direction of the combat vehicle hull relative to the forward direction of the helmet.

b) Top data bar 620—Shows camera polarity 621, brightness 622, GPS data 623, charging indicator 624 and battery level 625.

c) Bottom data bar 630—Shows ACV/APC direction 631, loader light 632, range 633, type of shell 634 and type of weapon 635 (e.g. cannon/machine gun).

Figure 6C:
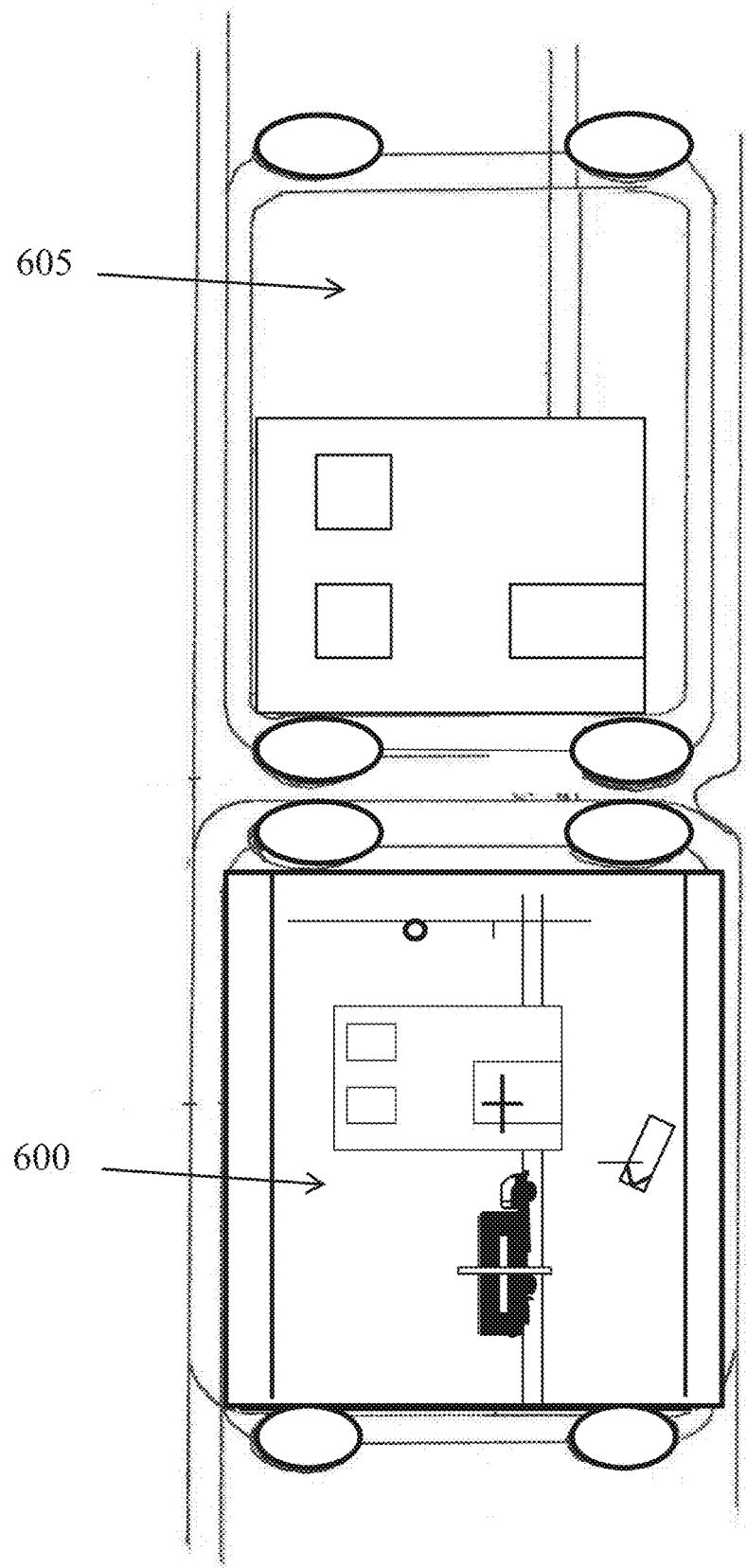

FIG. 6C shows image 600 on an eyepiece positioned in front of the wearer's left eye. The right eye sees the external scene through an opening or transparent portion of the frame 605.

Figure 6D:
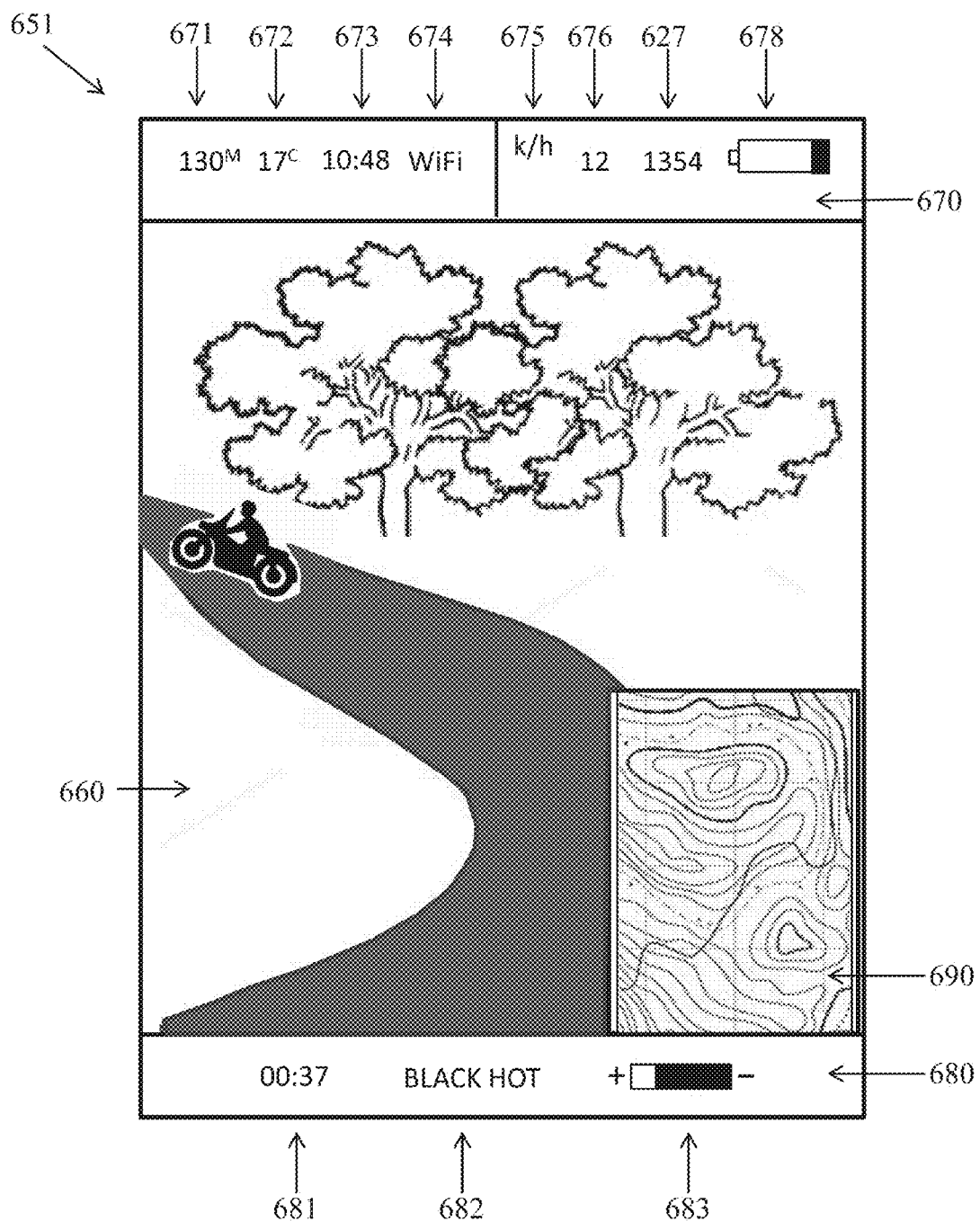

In the example of FIG. 6D, the wearer sees several windows in image 651 displayed on the eyepiece: external scene window 660, top data bar 670, bottom data bar 680 and corner window 690.

a) External scene window 660—The view of the external scene is seen in the central portion of the eyepiece, and may be input from a camera and/or viewed through a transparent portion of the eyepiece. Map inset 690 is viewed in the bottom right corner overlaying the external scene.

b) Top data bar 670—Shows altitude 671, temperature 672, time 673, WiFi indicator 674 (e.g. Smartphone or tablet connection), speed unit 425 (kilometers or miles per hour), speed 676, GPS data 677 and battery level 678.

c) Bottom data bar 680—Shows camera time remaining 681, camera polarity 682, and brightness 683.

d) Corner window 690—Shows a satellite or topographic map, optionally with other data such as humidity, travel distance and weather forecast. Typically, the data shown in corner window 690 is not obtained from the camera, but rather from other sources such as from a smart phone, the vehicle or via a wireless antenna in helmet (e.g. Bluetooth).

Examples of other information which may be shown to the wearer include but are not limited to:

a) Target data;

b) Meteorological conditions;

c) Text messages; and d) A map.

Figure 7A:
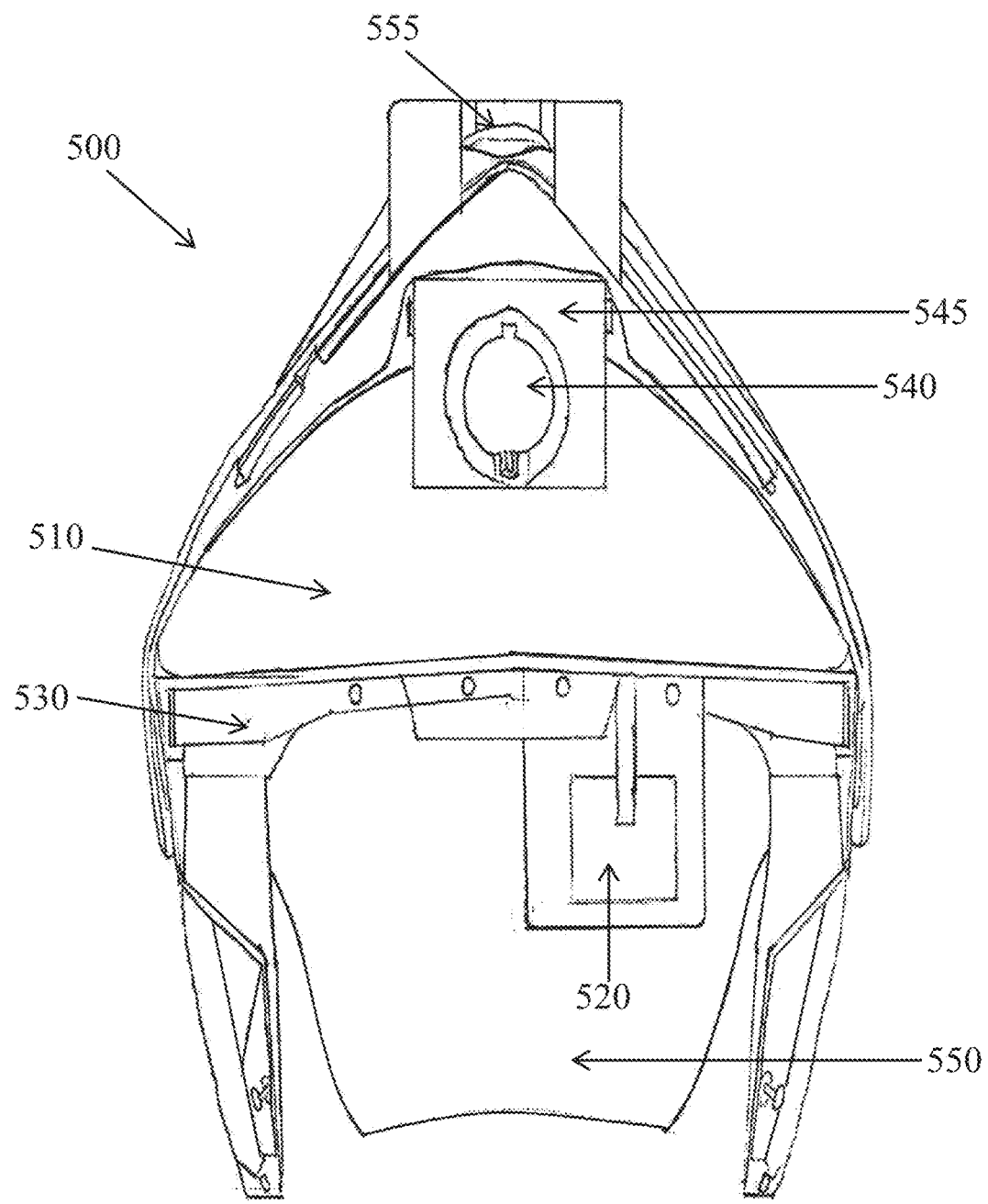
FIGS. 7A-7C are simplified schematic illustrations of frontal and side views of a helmet, according to embodiments of the invention.
Figure 7B:
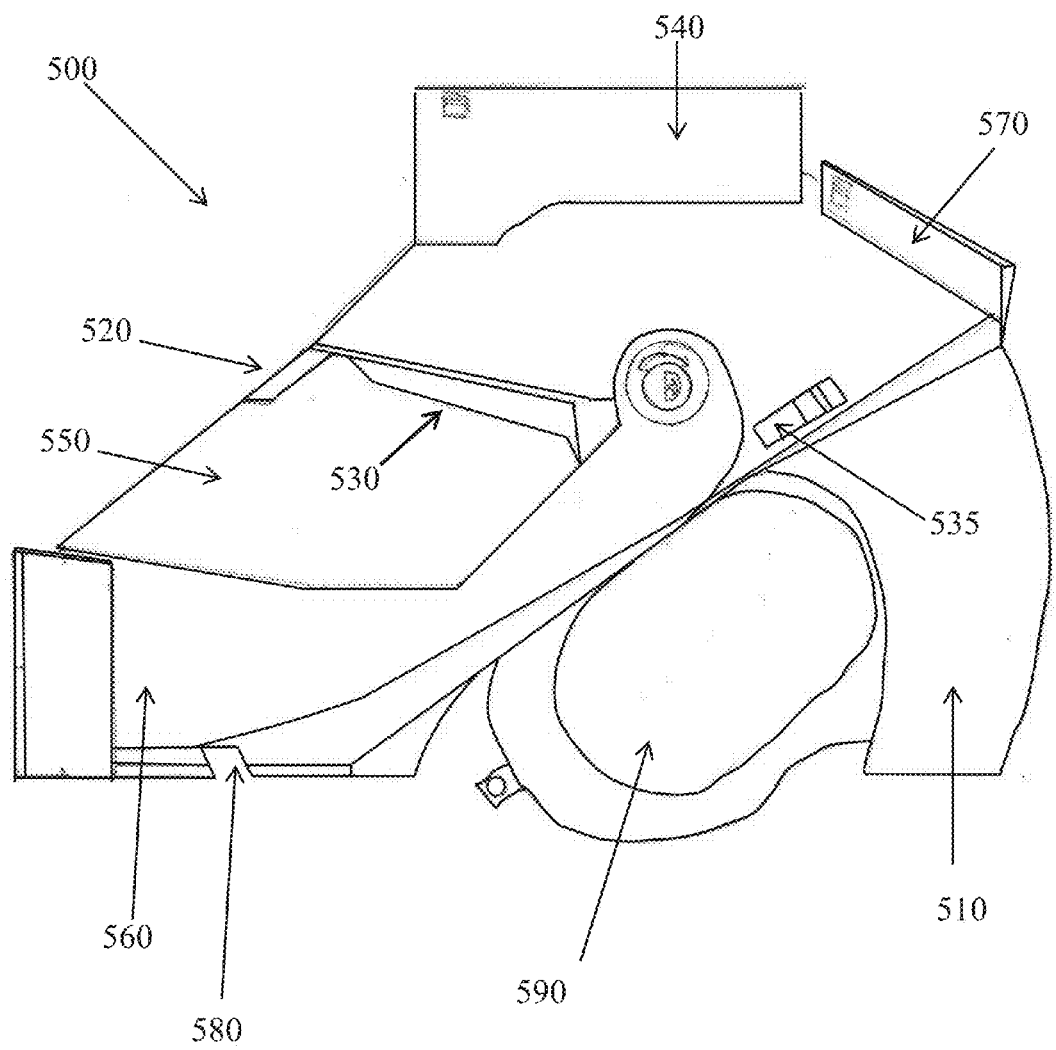
Figure 7C:
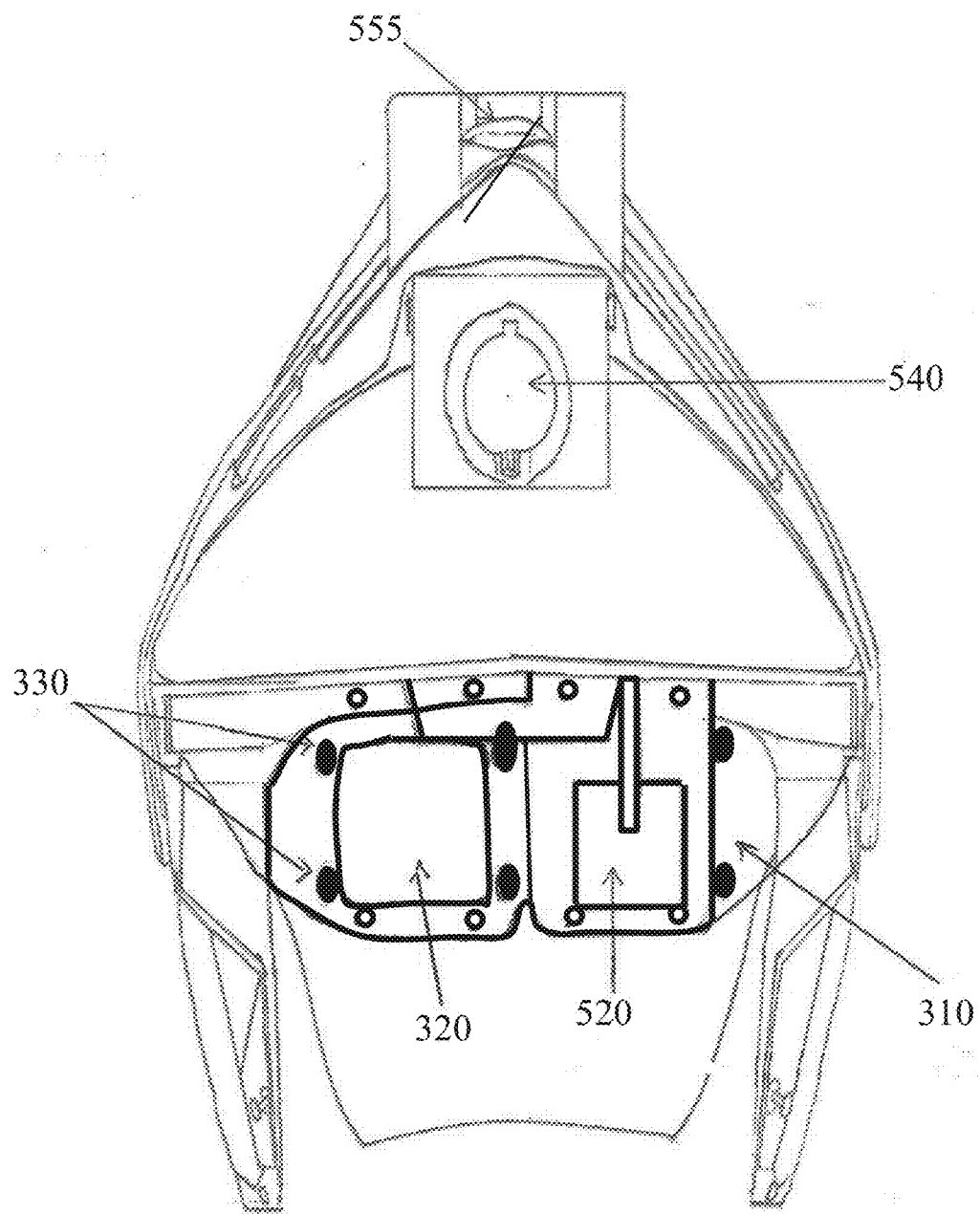

Reference is now made to FIGS. 7A-7C which are simplified schematic illustrations of frontal and side views of a helmet, according to exemplary embodiments of the invention. FIGS. 7A and 7B show embodiments in which mounting element 530 secures eyepiece 520 to shell 510 from above. FIG. 7C shows an embodiment in which the mounting element includes frame 310 with openings 320 and sensors 330, in which eyepiece 520 may move across the frame to be positioned in front of either opening.

Helmet 500 includes shell 510, eyepiece 520 and mounting element 530. Eyepiece 520 is attached to shell 510 by mounting element 530 and may be moved between left and right eyes easily and securely. Optionally, the mounting and eyepiece assembly is retractable into shell 510. Further optionally, eyepiece switch 535 is used by the wearer to open and retract the eyepiece, and may also serve for camera control (e.g. turning camera 540 on and off).

Helmet 500 includes a thermal camera 540 mounted on top of helmet 500, optionally having a magnification of ×1. Camera 540 is connected to helmet 500 via a dedicated and secured connection and may be rapidly disassembled and reassembled for storage or servicing. While camera 540 is connected to helmet 500 it is protected against damage and vibrations by a layer of insulating material 545. The germanium lens is protected by a cover connected to camera 540.

The wearer sees the image output from camera 540 on eyepiece 520. When there is a communication channel into a vehicle, the passengers in the vehicle are also able to view the camera's output on their personal screens by transferring the video-out data from camera 540 to the vehicle's computer and from there to each passenger's screen. The camera's output is optionally recorded and transferred, via a wired or wireless connection, to a command room. The camera's output is optionally recorded.

Camera 540 may change the brightness of the image and polarity of the objects viewed (i.e. black hot or white hot) automatically or under the wearer's control.

Optionally, camera 540 is activated by a trigger on camera 540.

Camera 540 is powered by a wired connection to the vehicle's power or alternatively by batteries in helmet 500.

Helmet 500 may be worn by a wearer traveling in a mobile vehicle, and has bi-directional communication with the vehicle's computing system. Helmet 500 also includes retractable face protector 560 (which protects the face, chin and nose) and/or retractable visor 550 that protects the eyes against laser beams and dust. Optionally face protector 560 and visor 550 may be raised and lowered together or separately.

Figure 7D:
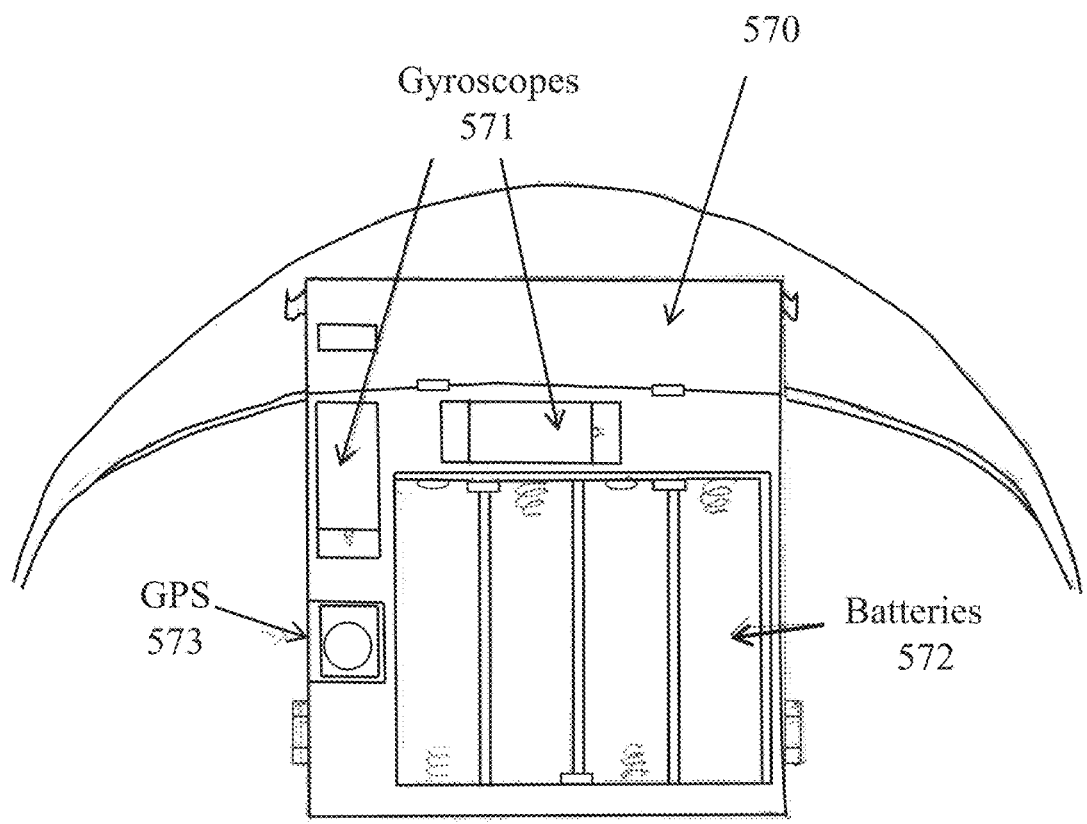
FIG. 7D is a simplified illustration of a housing according to an exemplary embodiment of the invention.

Helmet 500 includes housing 570 which is positioned on the top (apex) of helmet 500 behind camera 540. Housing 570 houses additional helmet components, including, but not limited to, one or more of: GPS element, gyroscopes, batteries and electronic circuitry. FIG. 7D is a simplified illustration of a housing 570 designed to house a pair of gyroscopes 571, batteries 572 and GPS element 573.

The batteries provide the power needed to operate camera 540, eyepiece 520 and the GPS element. Thus when helmet 500 is not connected to the vehicle, the wearer is still able to receive data from camera 540 and the GPS element using battery power. The batteries may be dedicated or conventional rechargeable batteries. The batteries may be charged when helmet 500 is connected to the vehicle by a cable. The batteries are securely housed within helmet 500, and are protected from damage and vibrations while allowing for easy disconnection.

GPS data may be viewed by the wearer on eyepiece 520. The GPS data may also be sent to the vehicle's computer via a data-cable extending from helmet 500 to the vehicle's computing system and from there to the other passengers' screens and/or to the command room screens. The wearer and the command room may use this data to control the movement of the vehicle and to get a position and a picture of the situation at the location of the vehicle.

A pair of gyroscopes is used for determining orientation and rotation.

Optionally the gyroscope data is also sent to the vehicle's computer via a data cable.

In some embodiments helmet 500 is adapted for use by a commander of an ACV or APC. By viewing the camera's output with one eye, the second eye is available for control and orientation of the vehicle. Data from the ACV's firing control computer is transmitted to helmet 500. By correlating data from the camera, gyroscopes, firing computer data and the movement of the vehicle, the wearer is able to accurately control the weaponry (e.g. cannon/machine gun) via the central firing control using the data displayed on eyepiece 520.

A central crosshair is displayed to the wearer in the center of the eyepiece for estimation of the target size and range. Central crosshair size is optionally one-thousandth by one-thousandth minute.

Data seen on eyepiece 520 optionally includes one or more of:

a) GPS data (optionally in one-thousandths of a minute);
b) Indicator of helmet battery remaining capacity;
c) Indicator of whether the helmet's cable is connected to the vehicle (e.g. for communication with vehicle and/or charging);
d) Indicators of image brightness and polarity of the objects viewed (i.e. black hot or white hot);
e) Firing control data. For example, in a tank the firing control data may include a firing switcher (indicating the cannon or the machine-gun), type of shell, the predetermined range, a light indicating the loader's readiness, and the tank hull position in thousandths of a minute. In an APC, the firing control data may indicate the primary or secondary weapons, the predetermined range and the APC's direction (optionally in thousandths of a minute); and
f) A weapon crosshair indicator.

Optionally, the weapon crosshair is displayed every time the wearer's line of vision crosses the weapon's (e.g. cannon's) trajectory. The weapon crosshair is shaped differently from the camera's crosshair. On the side of eyepiece 520, the weapon's azimuth is displayed in thousandths of a minute. The crosshair's size is optionally one-thousandth by one-thousandth of a minute. The weapon's crosshair indicator displays a combination of the helmet's gyroscopes data and the vehicle's computer. For precision purposes and for coordinating the wearer's field of vision to the weapon's aim, the sights between the wearer and the weapon may be aligned prior to operation or at any other stage. The alignment may be established using a dedicated actuator on helmet 500 or in the vehicle, and in the horizontal position relative to the plane of the vehicle's weapon.

The mounting element and eyepiece assembly (520 and 530) may be flipped up and down by a trigger on the helmet's side. The trigger may be locked in both the up and down positions and will not move from one position to the other without using reasonable force.

Helmet 500 includes visor 550 that serves as a laser and dust shield for the eyes. When visor 550 is flipped to its open (up) position (for example when goggles are worn) it does not obstruct camera 540 or the camera's output. Visor 550 may be efficiently and rapidly dismantled for cleaning or for replacement with a more protective visor. Visor switch 555 is used to raise the visor, optionally as a quick release switch which causes visor 550 to swing directly up when visor switch 555 is pressed.

Helmet 500 includes a face protector 560 (chin and nose) which may be flipped up for efficient and rapid placement of helmet 500 on the wearer's head, or for any other purpose that the wearer needs. When face protector 560 is in the raised position it remains there without falling down until force is applied. When face protector 560 is down it is locked in a dedicated resting position, and may be opened by way of an unobtrusive trigger on the front side of face protector 560. Visor 550 is designed and integrated with face protector 560 so that it shields the wearer's eyes from any angle and does not interfere with eyepiece 520.

Face protector 560 is lightweight and resistant to damage from front or side impacts by a rubber cover in front of the face protector in the area of the chin. The interior is padded with a sponge-like material for minimizing damage to the wearer's head if the wearer's head is hit by a solid object. Face protector 560 may be efficiently and rapidly dismounted from helmet 500 for any purpose. When face protector 560 is in the open (up) position it does not obstruct the camera lens enabling unobstructed or minimally-obstructed camera view.

Face protector 560 is connected to shell 510 in a manner that allows visor 550 to be opened and closed even when face protector 560 is closed.

Optionally, helmet 500 is designed to work with commercially available communications equipment such as Gentex and Boss.

On either side of face protector 560 there are slots 580 for the passage of a communication mouthpiece and for a drinking straw. The mouthpiece may be placed through side slots 580 in a way that opening (e.g. raising) face protector 560 does not interfere with the mouthpiece.

In the helmet's sides there are holes 590 in the vicinity of the wearer's ears which are large for the communication equipment's earpieces. There are clips in designated places on helmet 500 that constrain the communications equipment, allowing for a speedy and efficient replacement of any malfunctioning piece of equipment with a functioning one without disabling the whole helmet.

The cables and connections between helmet 500 and the vehicle may be intertwined and held together by encircling them with a cloth and clips or any other kind of wrapping of the wearer's choice, in order to avoid entanglement and trouble with the cables.

Components of helmet 500 are modular allowing for easy dismantling and replacement in case of damage to any of the individual components or for upgrading thereof. Optionally, each of the following components may be efficiently and rapidly dismantled and replaced: eyepiece 520, mounting element 530, camera 540, batteries, visor 550, face protector 560, communications elements, and cables. This modularity enables simple and efficient replacement of faulty components with functioning ones or replacing components having older less-advanced technology with newer components with updated technology without disabling the entire helmet 500.

Figure 8A:
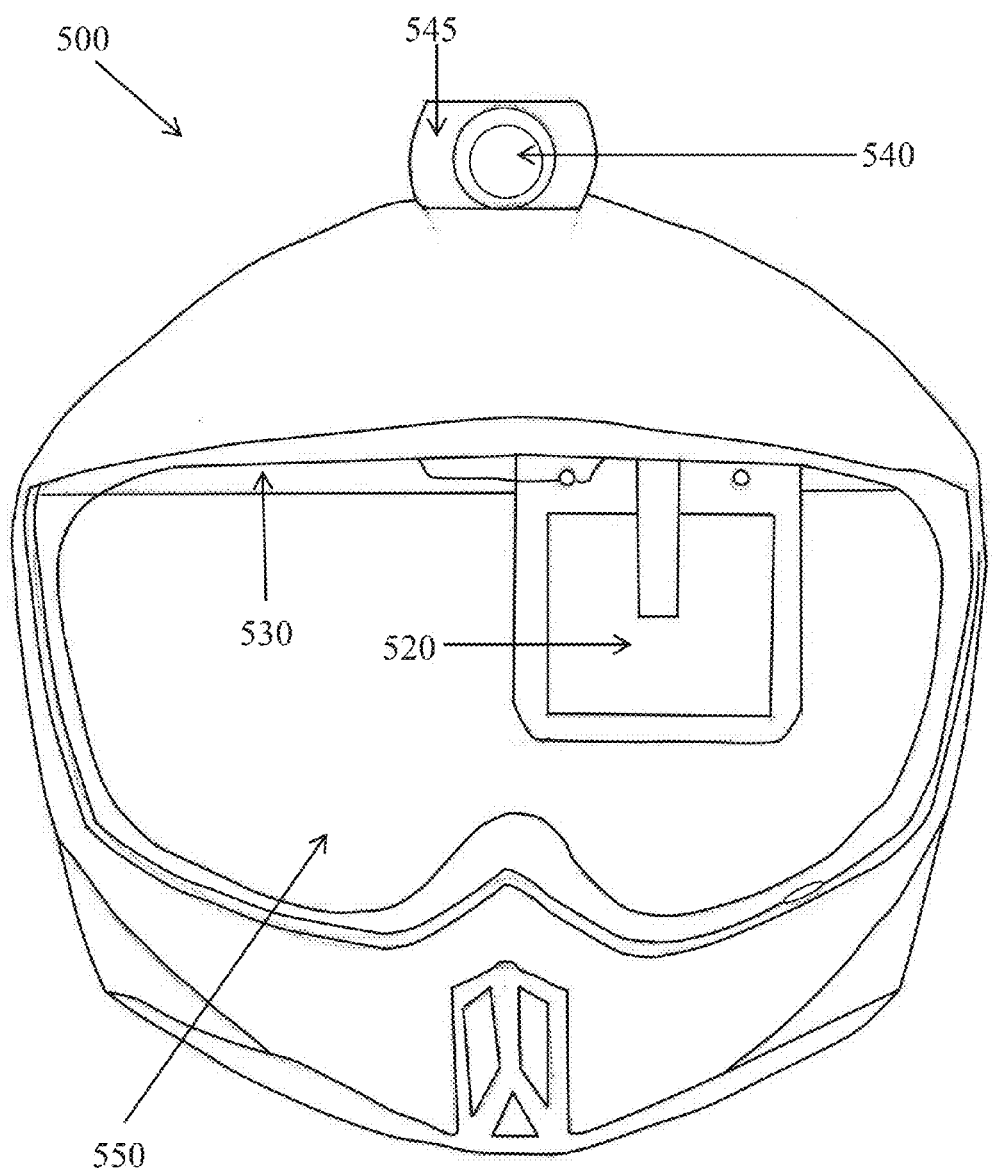
FIGS. 8A-8C are simplified schematic illustrations of frontal and side views of a helmet, according to embodiments of the invention.
Figure 8B:
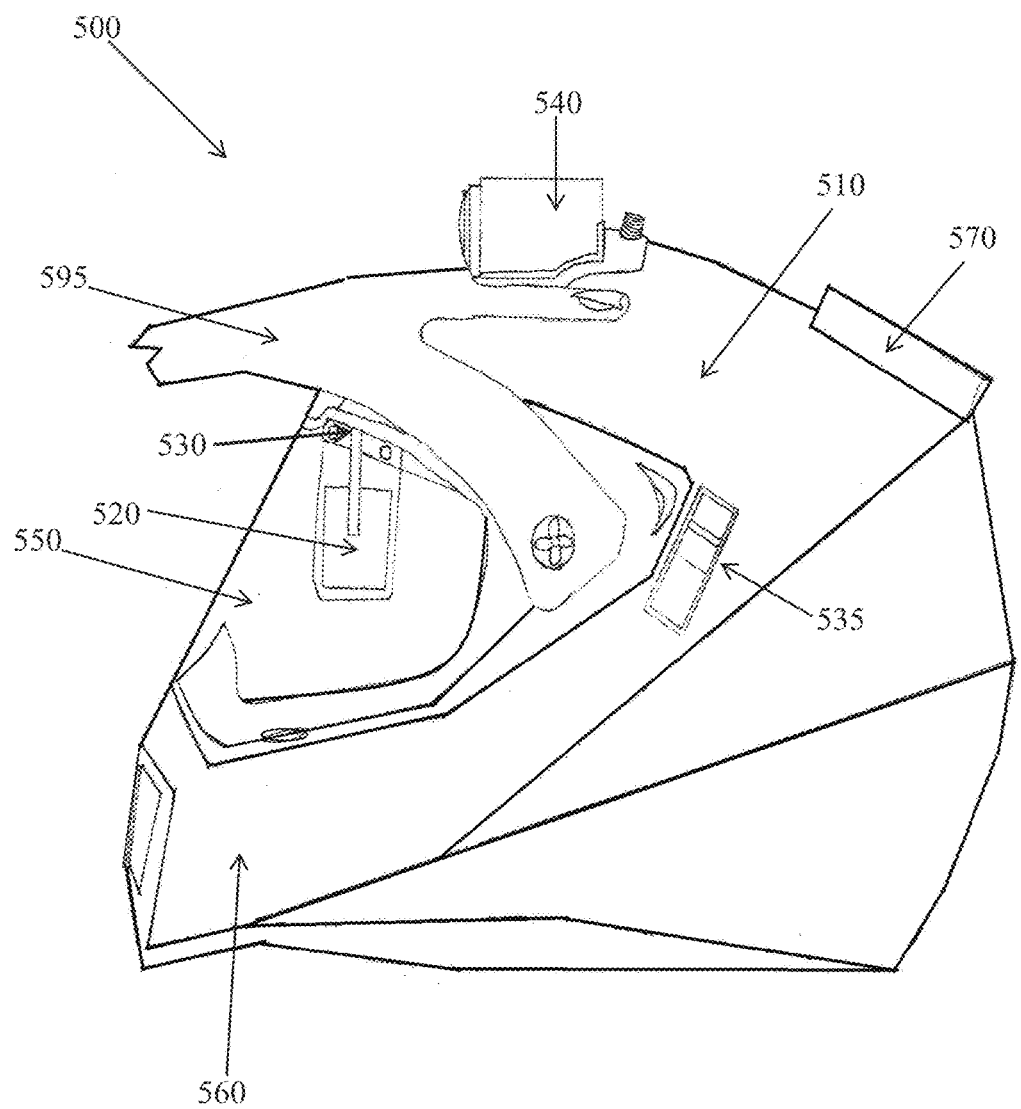
Figure 8C:
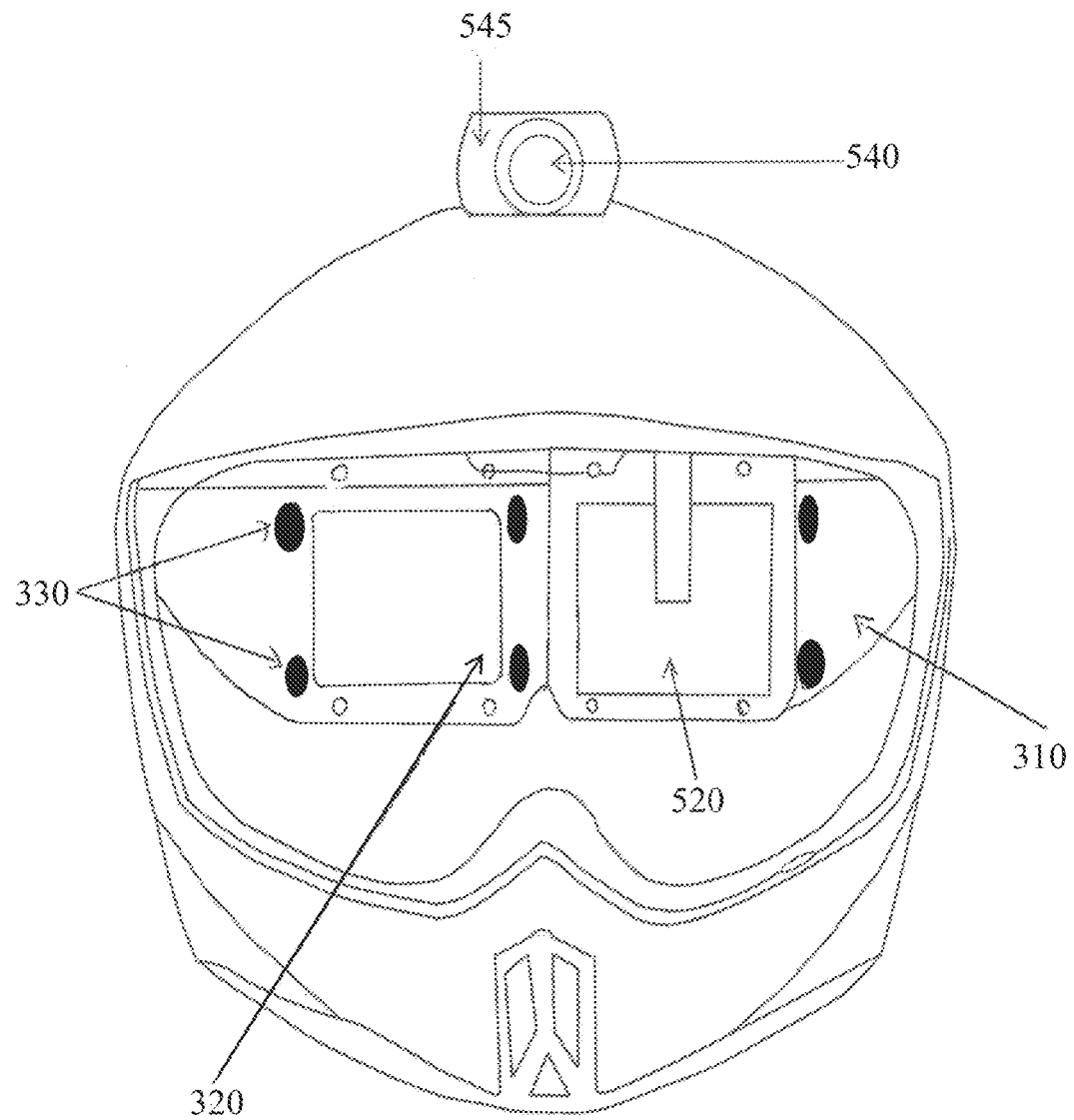

Reference is now made to FIGS. 8A-8C which are simplified schematic illustrations of frontal and side views of a helmet, according to exemplary embodiments of the invention. FIGS. 8A-8C correspond substantially to FIGS. 7A-7C, but demonstrate a different shape and style of helmet, which may be particularly suited for civilian use by motorcyclists and the like. FIGS. 8A and 8B show embodiments in which mounting element 530 secures eyepiece 520 to shell 510 from above. FIG. 8C shows an embodiment in which the mounting element includes frame 310 with openings 320 and sensors 330, in which eyepiece 520 may move across the frame to be positioned in front of either opening.

FIG. 8B shows optional sun shield 595 (possibly removable) which shades the wearer's eyes and face and provides protection from overhanging branches and bushes.

A helmet according to embodiments of the invention includes a protective shell, monocular eyepiece and mounting element. The protective shell includes an interior pocket along a frontal brim of the shell. The eyepiece displays an image signal overlaying a transparent portion of the eyepiece. The eyepiece includes an electronic input configured to input the image signal and at least one mechanical connector. The mounting element mechanically connects the eyepiece to the protective shell. The monocular eyepiece may be moved along the mounting element for positioning in front of a wearer's right eye or left eye. The mounting element is pivotably-connected to the protective shell, such that in a retracted position the mounting element and eyepiece are contained within the pocket and in an open position the eyepiece is positioned at eye level of a wearer.

Optionally, the shell includes a hardened exterior and an inner lining, and the interior pocket is formed by a gap between the hardened exterior and the inner lining.

Optionally, the helmet further includes communication circuitry configured to communicate with an external device (optionally located in a mobile vehicle).

Optionally, communication with the external device is wired communication via a cable connecting the helmet to the external device. Optionally, the helmet includes a visor which is pivotably-connected to the shell. The visor is exterior to the mounting element and eyepiece, such that in a raised position the visor is positioned above the shell and in a lowered position the visor shields the mounting element and eyepiece.

It is expected that during the life of a patent maturing from this application many relevant helmet shells, HUDs, AR eyeglasses, cameras, mountings, eyepieces, sun shields, visors, and aiming and firing control systems will be developed and the scope of the terms helmet shell, HUD, eyeglass, camera, mounting, eyepiece, sun shield, visor, and aiming and firing control is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A helmet comprising:
   a protective shell comprising an interior pocket under a front of said shell;
   a monocular eyepiece configured to display an image signal to a wearer of said helmet, said eyepiece comprising:
   i) an electronic input configured to input said image signal; and
   ii) a first mechanical connector at a top portion of said monocular eyepiece and a second mechanical connector at a bottom portion of said monocular eyepiece; and
   a mounting element, mechanically connected to said protective shell and to said monocular eyepiece, comprising a frame having respective openings in front of said wearer's right eye and left eye, said frame comprising:
an upper support element shaped to allow said first mechanical connector to slide along said upper support element;
a lower support element shaped to allow said second mechanical connector to slide along said lower support element;
a right vertical support element connected to said upper and lower support elements on a right side of said mounting element; and
a left vertical support element connected to said upper and lower support elements on a left side of said mounting element,
said monocular eyepiece being positioned between said upper and lower support elements to be secured in front of said wearer's right eye or left eye such that said wearer's direction of view is between said upper support element and said lower support element through a respective one of said openings,
wherein said mounting element is pivotably-connected to at least one side of an interior of said protective shell, such that in a retracted position said mounting element and eyepiece are contained within said pocket and in an open position said eyepiece is positioned at eye level of said wearer, and wherein said mounting element comprises at least one sensor to the right of said openings, at least one sensor to the left of said openings and at least one sensor between said openings.

2. A helmet according to claim 1, wherein said monocular eyepiece is a heads-up display.

3. A helmet according to claim 1, wherein said monocular eyepiece is an augmented reality eyeglass.

4. A helmet according to claim 1, wherein said monocular eyepiece is detachable and re-attachable to said mounting element, and said mounting element comprises a plurality of locations for attachment of said eyepiece to said mounting element.

5. A helmet according to claim 1, wherein said shell comprises a hardened exterior and an inner lining, and said interior pocket is formed by a gap between said hardened exterior and said inner lining.

6. A helmet according to claim 1, wherein said image signal comprises an image of an external scene.

7. A helmet according to claim 6, wherein said image signal further comprises data for display to said wearer of said helmet, and said data overlays said image of an external scene.

8. A helmet according to claim 1, further comprising communication circuitry configured to communicate with a device located in a mobile vehicle.

9. A helmet according to claim 8, wherein said communication with said device is wired communication via a cable connecting said helmet to said device.

10. A helmet according to claim 8, wherein said communication with said device is wireless.

11. A helmet according to claim 8, further comprising weapon control circuitry configured to control weaponry located on said vehicle.

12. A helmet according to claim 11, wherein said image signal displays crosshairs and said weapon control circuitry is configured to aim said weaponry towards a physical location viewed at said crosshairs.

13. A helmet according to claim 1, wherein said image signal overlays a transparent portion of said eyepiece.

14. A helmet according to claim 1, further comprising a visor pivotably-connected to said shell, wherein said visor is exterior to said mounting element and eyepiece, such that in a raised position said visor is positioned above said shell and in a lowered position said visor shields said mounting element and eyepiece.

15. A helmet according to claim 1, wherein said protective shell further comprises a camera mounting for mounting a camera on said protective shell.

16. A helmet according to claim 1, further comprising a data connector configured to connect to a data cable.

17. A helmet according to claim 1, further comprising a video connector configured to input data from a camera.

18. A helmet according to claim 1, further comprising a data processor configured to generate said image signal from data input from at least one of:
i) an external device;
ii) a camera;
iii) GPS (global positioning system);
iv) a gyroscope; and
v) a sensor.

19. A helmet according to claim 1, wherein said mounting element comprises a slot and said mechanical connector is inserted into said slot to slide said monocular eyepiece along said slot in both directions.

20. A helmet according to claim 1, wherein said mounting element comprises at least one sensor adapted to track movement of said wearer's right eye and at least one sensor adapted to track movement of said wearer's left eye.

21. A helmet according to claim 20, further comprising a data processor adapted to determine said wearer's direction of view by analyzing data collected by said at least two sensors and to display an indicator of said wearer's direction of view on said monocular eyepiece.

22. A helmet according to claim 1, wherein each of said openings encloses a transparent material.

* * * * *

UNITED STATES PATENT AND TRADEMARK OFFICE
CERTIFICATE OF CORRECTION

PATENT NO.       : 10,182,606 B2
APPLICATION NO.  : 15/015312
DATED            : January 22, 2019
INVENTOR(S)      : Amit Tal Page 1 of 1

It is certified that error appears in the above-identified patent and that said Letters Patent is hereby corrected as shown below:

On the Title Page

Item (54), and in the Specification, Column 1 Line 1, "HELMUT" should be changed to
-- HELMET --

Signed and Sealed this
Second Day of April, 2019

Andrei Iancu
*Director of the United States Patent and Trademark Office*